United States Patent
Wease

(10) Patent No.: US 8,272,055 B2
(45) Date of Patent: Sep. 18, 2012

(54) TARGET-BASED SMB AND DCE/RPC PROCESSING FOR AN INTRUSION DETECTION SYSTEM OR INTRUSION PREVENTION SYSTEM

(75) Inventor: Kenneth Todd Wease, Columbia, MD (US)

(73) Assignee: Sourcefire, Inc., Columbia, MD (US)

( * ) Notice: Subject to any disclaimer, the term of this patent is extended or adjusted under 35 U.S.C. 154(b) by 391 days.

(21) Appl. No.: 12/575,612

(22) Filed: Oct. 8, 2009

(65) Prior Publication Data

US 2010/0088767 A1    Apr. 8, 2010

Related U.S. Application Data

(60) Provisional application No. 61/103,630, filed on Oct. 8, 2008.

(51) Int. Cl.
G06F 11/00    (2006.01)

(52) U.S. Cl. ............... 726/23; 713/193; 726/22; 726/25; 726/26

(58) Field of Classification Search ...................... 726/23
See application file for complete search history.

(56) References Cited

U.S. PATENT DOCUMENTS

| | | |
|---|---|---|
| 4,550,436 A | 10/1985 | Freeman |
| 4,570,157 A | 2/1986 | Kodaira |
| 4,857,912 A | 8/1989 | Everett et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A | 6/1993 | Lewis et al. |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,495,409 A | 2/1996 | Kanno |
| 5,497,463 A | 3/1996 | Stein et al. |
| 5,604,910 A | 2/1997 | Kojima et al. |
| 5,666,293 A | 9/1997 | Metz et al. |
| 5,796,942 A | 8/1998 | Esbensen |

(Continued)

FOREIGN PATENT DOCUMENTS

EP    2166725 A1    3/2010

(Continued)

OTHER PUBLICATIONS

U.S. Appl. No. 12/969,682, filed Dec. 2010, Roesch et al.

(Continued)

*Primary Examiner* — Taghi Arani
*Assistant Examiner* — Mohammad Rahman
(74) *Attorney, Agent, or Firm* — Posz Law Group, PLC

(57) ABSTRACT

A method performed in a processor of an intrusion detection/prevention system (IDS/IPS) checks for valid packets in an SMB named pipe in a communication network. In a processor configured as an IDS/IPS, a packet in a transmission is received and a kind of application of a target of the packet is determined. Also, the data in the packet is inspected by the IDS/IPS as part of the SMB named pipe on only one of a condition that: (a) the FID in an SMB command header of the packet is valid (i) for segments/fragments in the SMB named pipe and (ii) for the determined kind of application of the target of the packet, as indicated by a reassembly table, and (b) the determined kind of application of the target of the packet does not check the FID, as indicated by the reassembly table.

1 Claim, 12 Drawing Sheets

U.S. PATENT DOCUMENTS

| | | |
|---|---|---|
| 5,870,554 A | 2/1999 | Grossman et al. |
| 5,881,269 A * | 3/1999 | Dobbelstein ............... 703/21 |
| 5,901,307 A | 5/1999 | Potter et al. |
| 5,917,821 A | 6/1999 | Gobuyan et al. |
| 5,919,257 A | 7/1999 | Trostle |
| 5,963,942 A | 10/1999 | Igata |
| 5,987,473 A | 11/1999 | Jorgensen |
| 5,995,963 A | 11/1999 | Nanba et al. |
| 5,999,937 A | 12/1999 | Ellard |
| 6,002,427 A | 12/1999 | Kipust |
| 6,141,686 A | 10/2000 | Jackowski et al. |
| 6,199,181 B1 | 3/2001 | Rechef et al. |
| 6,219,786 B1 | 4/2001 | Cunningham et al. |
| 6,320,848 B1 | 11/2001 | Edwards et al. |
| 6,321,338 B1 | 11/2001 | Porras et al. |
| 6,324,656 B1 | 11/2001 | Gleichauf et al. |
| 6,334,121 B1 | 12/2001 | Primeaux et al. |
| 6,343,362 B1 | 1/2002 | Ptacek et al. |
| 6,393,474 B1 | 5/2002 | Eichert et al. |
| 6,415,321 B1 | 7/2002 | Gleichauf et al. |
| 6,453,354 B1 * | 9/2002 | Jiang et al. ............... 709/229 |
| 6,477,648 B1 | 11/2002 | Schell et al. |
| 6,487,666 B1 | 11/2002 | Shanklin et al. |
| 6,499,107 B1 | 12/2002 | Gleichauf et al. |
| 6,539,381 B1 | 3/2003 | Prasad et al. |
| 6,546,493 B1 | 4/2003 | Magdych et al. |
| 6,587,876 B1 | 7/2003 | Mahon et al. |
| 6,590,885 B1 | 7/2003 | Jorgensen |
| 6,678,734 B1 | 1/2004 | Haatainen et al. |
| 6,678,824 B1 | 1/2004 | Cannon et al. |
| 6,684,332 B1 | 1/2004 | Douglas |
| 6,711,127 B1 | 3/2004 | Gorman et al. |
| 6,754,826 B1 | 6/2004 | Challenger et al. |
| 6,766,320 B1 | 7/2004 | Wang et al. |
| 6,772,196 B1 | 8/2004 | Kirsch et al. |
| 6,789,202 B1 | 9/2004 | Ko et al. |
| 6,816,973 B1 | 11/2004 | Gleichauf et al. |
| 6,851,061 B1 | 2/2005 | Holland et al. |
| 6,957,348 B1 | 10/2005 | Flowers et al. |
| 6,983,323 B2 | 1/2006 | Cantrell et al. |
| 6,993,706 B2 | 1/2006 | Cook |
| 6,999,998 B2 | 2/2006 | Russell |
| 7,032,114 B1 | 4/2006 | Moran |
| 7,054,930 B1 | 5/2006 | Cheriton |
| 7,058,821 B1 | 6/2006 | Parekh et al. |
| 7,065,657 B1 | 6/2006 | Moran |
| 7,073,198 B1 | 7/2006 | Flowers et al. |
| 7,076,803 B2 | 7/2006 | Bruton et al. |
| 7,096,503 B1 | 8/2006 | Magdych et al. |
| 7,113,789 B1 | 9/2006 | Boehmke |
| 7,133,916 B2 | 11/2006 | Schunemann |
| 7,134,141 B2 | 11/2006 | Crosbie et al. |
| 7,152,105 B2 | 12/2006 | McClure et al. |
| 7,174,566 B2 | 2/2007 | Yadav |
| 7,181,769 B1 | 2/2007 | Keanini et al. |
| 7,231,665 B1 | 6/2007 | McArdle et al. |
| 7,243,148 B2 | 7/2007 | Keir et al. |
| 7,257,630 B2 | 8/2007 | Cole et al. |
| 7,305,708 B2 | 12/2007 | Norton et al. |
| 7,310,688 B1 | 12/2007 | Chin |
| 7,313,695 B2 | 12/2007 | Norton et al. |
| 7,315,801 B1 | 1/2008 | Dowd et al. |
| 7,317,693 B1 | 1/2008 | Roesch et al. |
| 7,346,922 B2 | 3/2008 | Miliefsky |
| 7,350,077 B2 | 3/2008 | Meier et al. |
| 7,363,656 B2 | 4/2008 | Weber et al. |
| 7,365,872 B2 * | 4/2008 | Lawrence et al. ............ 358/1.15 |
| 7,467,202 B2 | 12/2008 | Savchuk |
| 7,467,205 B1 | 12/2008 | Dempster et al. |
| 7,467,410 B2 | 12/2008 | Graham et al. |
| 7,493,388 B2 | 2/2009 | Wen et al. |
| 7,496,662 B1 | 2/2009 | Roesch et al. |
| 7,496,962 B2 | 2/2009 | Roelker et al. |
| 7,519,954 B1 | 4/2009 | Beddoe et al. |
| 7,539,681 B2 | 5/2009 | Norton et al. |
| 7,580,370 B2 | 8/2009 | Boivie et al. |
| 7,594,273 B2 | 9/2009 | Keanini et al. |
| 7,596,807 B2 | 9/2009 | Ptacek et al. |
| 7,644,275 B2 | 1/2010 | Mowers et al. |
| 7,664,845 B2 | 2/2010 | Kurtz et al. |
| 7,673,043 B2 | 3/2010 | Keir et al. |
| 7,680,929 B1 | 3/2010 | Lyon |
| 7,730,011 B1 | 6/2010 | Deninger et al. |
| 7,801,980 B1 | 9/2010 | Roesch et al. |
| 7,805,762 B2 | 9/2010 | Rowland |
| 7,885,190 B1 | 2/2011 | Roesch et al. |
| 7,949,732 B1 | 5/2011 | Roesch et al. |
| 8,020,211 B2 | 9/2011 | Keanini et al. |
| 8,041,773 B2 | 10/2011 | Abu-Ghazaleh et al. |
| 2001/0027485 A1 | 10/2001 | Ogishi et al. |
| 2001/0034847 A1 | 10/2001 | Gaul, Jr. |
| 2002/0035639 A1 | 3/2002 | Xu |
| 2002/0066034 A1 | 5/2002 | Schlossberg |
| 2002/0083344 A1 | 6/2002 | Vairavan |
| 2002/0087716 A1 | 7/2002 | Mustafa |
| 2002/0112185 A1 | 8/2002 | Hodges |
| 2002/0123995 A1 | 9/2002 | Shibuya |
| 2002/0143918 A1 | 10/2002 | Soles et al. |
| 2002/0165707 A1 | 11/2002 | Call |
| 2003/0009699 A1 | 1/2003 | Gupta et al. |
| 2003/0014662 A1 | 1/2003 | Gupta et al. |
| 2003/0046388 A1 | 3/2003 | Milliken |
| 2003/0065817 A1 | 4/2003 | Benchetrit et al. |
| 2003/0083847 A1 | 5/2003 | Schertz et al. |
| 2003/0093517 A1 | 5/2003 | Tarquini |
| 2003/0101353 A1 | 5/2003 | Tarquini et al. |
| 2003/0126472 A1 | 7/2003 | Banzhof |
| 2003/0140250 A1 | 7/2003 | Taninaka et al. |
| 2003/0195874 A1 | 10/2003 | Akaboshi |
| 2003/0212779 A1 | 11/2003 | Boyter et al. |
| 2003/0212910 A1 | 11/2003 | Rowland et al. |
| 2003/0217283 A1 | 11/2003 | Hrastar et al. |
| 2003/0229726 A1 | 12/2003 | Daseke et al. |
| 2004/0010684 A1 | 1/2004 | Douglas |
| 2004/0015728 A1 | 1/2004 | Cole et al. |
| 2004/0034773 A1 | 2/2004 | Balabine et al. |
| 2004/0064726 A1 | 4/2004 | Girouard |
| 2004/0073800 A1 | 4/2004 | Shah et al. |
| 2004/0093408 A1 | 5/2004 | Hirani et al. |
| 2004/0093582 A1 | 5/2004 | Segura |
| 2004/0098618 A1 | 5/2004 | Kim et al. |
| 2004/0123153 A1 | 6/2004 | Wright et al. |
| 2004/0172234 A1 | 9/2004 | Dapp et al. |
| 2004/0179477 A1 | 9/2004 | Lincoln et al. |
| 2004/0193943 A1 | 9/2004 | Angelino et al. |
| 2004/0210756 A1 | 10/2004 | Mowers et al. |
| 2004/0218532 A1 | 11/2004 | Khirman |
| 2004/0221176 A1 | 11/2004 | Cole |
| 2004/0250032 A1 | 12/2004 | Ji et al. |
| 2004/0268358 A1 | 12/2004 | Darling et al. |
| 2005/0005169 A1 | 1/2005 | Kelekar |
| 2005/0015623 A1 | 1/2005 | Williams et al. |
| 2005/0044422 A1 | 2/2005 | Cantrell et al. |
| 2005/0076066 A1 | 4/2005 | Stakutis et al. |
| 2005/0108393 A1 | 5/2005 | Banerjee et al. |
| 2005/0113941 A1 | 5/2005 | Ii et al. |
| 2005/0114700 A1 | 5/2005 | Barrie et al. |
| 2005/0160095 A1 | 7/2005 | Dick et al. |
| 2005/0172019 A1 | 8/2005 | Williamson et al. |
| 2005/0188080 A1 | 8/2005 | Motsinger et al. |
| 2005/0223014 A1 * | 10/2005 | Sharma et al. ............... 707/10 |
| 2005/0229255 A1 | 10/2005 | Gula et al. |
| 2005/0240604 A1 | 10/2005 | Corl, Jr. et al. |
| 2005/0251500 A1 | 11/2005 | Vahalia et al. |
| 2005/0268331 A1 | 12/2005 | Le et al. |
| 2005/0268332 A1 | 12/2005 | Le et al. |
| 2005/0273673 A1 | 12/2005 | Gassoway |
| 2005/0273857 A1 | 12/2005 | Freund |
| 2006/0174337 A1 | 8/2006 | Bernoth |
| 2006/0265748 A1 | 11/2006 | Potok |
| 2006/0288053 A1 | 12/2006 | Holt et al. |
| 2006/0294588 A1 | 12/2006 | Lahann et al. |
| 2007/0027913 A1 | 2/2007 | Jensen et al. |
| 2007/0058631 A1 | 3/2007 | Mortier et al. |
| 2007/0143852 A1 | 6/2007 | Keanini et al. |
| 2007/0162463 A1 | 7/2007 | Kester et al. |
| 2007/0192286 A1 | 8/2007 | Norton et al. |

| | | | |
|---|---|---|---|
| 2007/0192863 A1 | 8/2007 | Kapoor et al. | |
| 2007/0195797 A1 | 8/2007 | Patel et al. | |
| 2007/0271371 A1 | 11/2007 | Singh Ahuja et al. | |
| 2007/0283007 A1 | 12/2007 | Keir et al. | |
| 2007/0283441 A1 | 12/2007 | Cole et al. | |
| 2007/0288579 A1 | 12/2007 | Schunemann | |
| 2008/0037587 A1 | 2/2008 | Roesch et al. | |
| 2008/0115213 A1 | 5/2008 | Bhatt et al. | |
| 2008/0127342 A1 | 5/2008 | Roesch et al. | |
| 2008/0133523 A1 | 6/2008 | Norton et al. | |
| 2008/0168561 A1 | 7/2008 | Durie et al. | |
| 2008/0196102 A1 | 8/2008 | Roesch | |
| 2008/0198856 A1 | 8/2008 | Vogel, III et al. | |
| 2008/0209518 A1 | 8/2008 | Sturges et al. | |
| 2008/0244741 A1 | 10/2008 | Gustafson et al. | |
| 2008/0263197 A1 | 10/2008 | Stephens | |
| 2008/0276319 A1 | 11/2008 | Rittermann | |
| 2008/0289040 A1 | 11/2008 | Ithal | |
| 2009/0019141 A1 | 1/2009 | Bush et al. | |
| 2009/0028147 A1 | 1/2009 | Russell | |
| 2009/0041020 A1 | 2/2009 | Gibbons et al. | |
| 2009/0055691 A1 | 2/2009 | Ouksel et al. | |
| 2009/0164517 A1 | 6/2009 | Shields et al. | |
| 2009/0182864 A1 | 7/2009 | Khan et al. | |
| 2009/0259748 A1 | 10/2009 | McClure et al. | |
| 2009/0271696 A1 | 10/2009 | Bailor et al. | |
| 2009/0282481 A1 | 11/2009 | Dow et al. | |
| 2009/0320138 A1* | 12/2009 | Keanini et al. | 726/25 |
| 2010/0050260 A1 | 2/2010 | Nakakoji et al. | |
| 2010/0161795 A1 | 6/2010 | Deridder et al. | |
| 2011/0307600 A1 | 12/2011 | Polley et al. | |
| 2011/0314143 A1 | 12/2011 | Vogel, III et al. | |

FOREIGN PATENT DOCUMENTS

| | | |
|---|---|---|
| GB | 2 432 933 A | 6/2007 |
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |
| WO | WO 2009/032925 A1 | 3/2009 |

OTHER PUBLICATIONS

Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with related U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,980.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.

Office Action issued by the U.S. Patent Office on Dec. 17, 2009 in connection with related U.S. Appl. No. 11/493,934.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.
Notice of Allowance issued by the U.S. Patent Office on Feb. 24, 2011 in connection with related U.S. Appl. No. 11/493,934.
Final Office Action issued by the U.S. Patent Office on Dec. 9, 2011 in connection with related U.S. Appl. No. 12/688,400.
Office Action issued by the U.S. Patent Office on Feb. 2, 2012 in connection with related U.S. Appl. No. 12/688,400.
Office Action issued by the U.S. Patent Office on Feb. 15, 2012 in connection with related U.S. Appl. No. 12/820,227.
Office Action issued by the U.S. Patent Office on Feb. 15, 2012 in connection with related U.S. Appl. No. 12/230,338.
Office Action issued by the U.S. Patent Office on Mar. 5, 2012 in connection with related U.S. Appl. No. 12/968,682.
R. Gula, "Passive Vulnerability Detection. *Techniques to passively find network security vulnerabilities*," Sep. 9, 1999 (5 pp.).
R.P. Lippmann et al., "Passive Operating System Identification from TCP/IP Packet Headers," *Proceedings Workshop on Data Mining for Computer Security (DMSEC)*, Nov. 2003 (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Advisory Action issued by the U.S. Patent Office on Feb. 24, 2010 in connection with related U.S. Appl. No. 11/272,035.
Office Action issued by the U.S. Patent Office on Mar. 22, 2010 in connection with related U.S. Appl. No. 11/493,934.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Notice of Allowance issued by the U.S. Patent Office on Feb. 5, 2010 in connection with related U.S. Appl. No. 11/272,034.
Office Action issued by the U.S. Patent Office on Mar. 16, 2010 in connection with related U.S. Appl. No. 11/272,035.
International Search Report and Written Opinion of the International Searching Authority issued on Mar. 16, 2010 in connection with PCT application No. PCT/US09/59965, which corresponds to U.S. Appl. No. 12/575,612.
U.S. Appl. No. 13/046,127, filed Mar. 11, 2011, Roesch.
U.S. Appl. No. 13/086,819, filed Apr. 14, 2011, Olney et al.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx, Dec. 1, 2009.

Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).

Office Action issued by the U.S. Patent Office on Apr. 6, 2011 in connection with related U.S. Appl. No. 11/711,876.

Office Action issued by the U.S. Patent Office on Apr. 13, 2011 in connection with related U.S. Appl. No. 12/230,338.

Office Action issued by the U.S. Patent Office on May 12, 2011 in connection with related U.S. Appl. No. 12/149,196.

Notice of Allowance issued by the U.S. Patent Office on Apr. 6, 2011 in connection with related U.S. Appl. No. 12/010,900.

PCT International Preliminary Report on Patentability mailed on Apr. 21, 2011 by the International Bureau of WIPO in connection with PCT patent application No. PCT/US2009/059965, which corresponds to U.S. Appl. No. 12/575,612.

U.S. Appl. No. 12/813,859, filed Jun. 2010, Polley et al.

V. Jacobson, et al., Request for Comments: 1323, "TCP Extensions for High Performance," May 1992 (35 pages).

D. Joseph, et al., "A Policy-aware Switching Layer for Data Centers," *SIGCOMM*, Aug. 17-22, 2008, pp. 51-62.

Office Action issued by the U.S. Patent Office on Apr. 7, 2010 in connection with related U.S. Appl. No. 11/711,876.

Office Action issued by the U.S. Patent Office on Apr. 15, 2010 in connection with related U.S. Appl. No. 12/010,900.

Office Action issued by the U.S. Patent Office on Apr. 21, 2010 in connection with related U.S. Appl. No. 10/843,459.

Notice of Allowance issued by the U.S. Patent Office on May 24, 2010 in connection with related U.S. Appl. No. 10/843,398.

Office Action issued by the U.S. Patent Office on May 31, 2011 in connection with related U.S. Appl. No. 12/688,400.

Notice of Allowance issued by the U.S. Patent Office on Jun. 22, 2011 in connection with related U.S. Appl. No. 11/272,035.

Notice of Allowance issued by the U.S. Patent Office on Jul. 22, 2011 in connection with related U.S. Appl. No. 11/711,876.

Extended European Search Report issued by the European Patent Office on Jul. 19, 2011 in connection with European patent application No. 06837333.1-2413, which corresponds to related U.S. Patent No. 7,733,803.

International Search Report and Written Opinion of the International Searching Authority issued on Jul. 28, 2011 in connection with PCT application No. PCT/US2011/032489, which corresponds to U.S. Appl. No. 13/086,819.

Matthew Olney et al.: "What would you do with a pointer and a size? A New Detection Framework", Apr. 22, 2010, XP55002567, http://labs.snort.org/nrt/sfvrt-nrt.pdf (retrieved on Jul. 12, 2011) the whole document.

U.S. Appl. No. 12/820,227, filed Jun. 2010, Vogel, III, et al.

R. Hiyoshi, "Practical Guide to Intrusion Detection System: Snort & Tripwire," Japan, Apr. 25, 2004, pp. 57-230 (concise English explanation of relevance attached).

"Enhanced Operating System Identification with Nessus," Tenable Network Security (2007), obtained from: http://blog.tenablesecurity.com/2009/02/enhanced_operat.html, posted by R. Gula on Feb. 16, 2009 (3 pp. total).

Advisory Action issued by the U.S. Patent Office on Aug. 3, 2010 in connection with related U.S. Appl. No. 10/843,374.

Final Office Action issued by the U.S. Patent Office on Sep. 8, 2010 in connection with related U.S. Appl. No. 10/843,459.

Final Office Action issued by the U.S. Patent Office on Sep. 17, 2010 in connection with related U.S. Appl. No. 11/711,876.

Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).

Final Office Action issued by the U.S. Patent Office on Sep. 30, 2010 in connection with related U.S. Appl. No. 11/493,934.

U.S. Appl. No. 10/843,353, filed May 2004, Roesch et al., System and Method for Determining Characteristics of a Network and Analyzing Vulnerabilities.

U.S. Appl. No. 10/843,373, filed May 2004, Roesch et al., Systems and Methods for Identifying the Services of a Network.

U.S. Appl. No. 10/843,374, filed May 2004, Roesch et al., System and Methods for Determining Characteristics of a Network Based on Flow Analysis.

U.S. Appl. No. 10/843,398, filed May 2004, Roesch et al., Systems and Methods for Determining Characteristics of a Network.

U.S. Appl. No. 10/843,459, filed May 2004, Roesch et al., Systems and Methods for Determining Characteristics of a Network and Enforcing Policy.

U.S. Appl. No. 12/230,338, filed Aug. 2008, Sturges et al., Speed and Memory Optimization of Intrusion Detection System (IDS) and Intrusion Prevention System (IPS) Rule Processing.

Aho et al., "Efficient String Matching: An Aid to Bibliographic Search," *Communications from the ACM* (Jun. 1975), vol. 18, No. 6, pp. 333-340.

Tarjan, et al., "Storing a Sparse Table," Communications of the ACM (Nov. 1979), vol. 2, No. 11, pp. 606-620.

T. Ptacek, et al., "Insertion, Evasion, and Denial of Service: Eluding Network Intrusion Detection", Jan. 1998, pp. 1-63.

J. Howe, "An Environment for "Sniffing" DCE-RPC Traffic," *CITI Technical Report 93-4*, Jun. 21, 1993, 12 pages total.

N. Chase, "Active Server pp. 3.0 from Scratch" (Dec. 1999), Searching for products section, 13 pp.

L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.

B. Krishnamurthy, "Web Protocols and Practice," (May 1, 2001), pp. 518-520.

G. Lyon, "Remote OS detection via TCP/IP Stack Fingerprinting"(Jun. 30, 2002), pp. 1-12, obtained from: http://web.archive.org/web20021017063625/www.insecure.org/nmap/nmap-fingerprinting-article.html.

U. Shankar and V. Paxson, *Active Mapping: Resisting NIDS Evasion Without Altering Traffic*, Proc. IEEE Symposium on Security and Privacy. May 2003, pp. 1-18.

D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.

Norton et al., "Multi-Patten Search Engine Aho-Corasick State Machine" (Mar. 17, 2004), Version 2.0, 36 pp.

R. Deraison, et al., "Passive Vulnerability Scanning. Introduction to NeVO," Tenable Network Security, May 30, 2004, pp. 1-13.

Full Band and Matrix Algorithms (Jun. 9, 2004), http://web.archive.org/web20040109154658/http://www.netlib.org/utk/Isi/pcwLSI/text/node150.html.

M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.

R. Deraison, et al., "Nessus Network Auditing," *Sungress Publishing*, Jul. 20, 2004, pp. 1-13.

Norton et al., "Sourcefire Optimizing Pattern Matching for Intrusion Detection" (Sep. 2004), 14 pp.

J. Novak, "Target-Based Fragmentation Reassembly" (Apr. 2005), Revision 2.0, pp. 1-32.

S.Siddharth, "Evading NIDS, revisited" (Dec. 12, 2005).

"Snort™ Users Manual 2.6.0," *The Snort Project* (May 23, 2006), pp. 1-126.

"toupper()—convert lowercase character to uppercase," http://www.mkssoftware.com, printed on Sep. 20, 2008 from http://web.archive.org, archive date Jun. 30, 2006, 2 pp.

J. Novak et al., "Target-Based TCP Stream Reassembly" (Aug. 3, 2007), Revision 1.0, pp. 1-23, obtained from: http://www.snort/org/docs/stream5-modelAUg032007.pdf.

"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.

Office Action issued by the U.S. Patent Office on Jul. 16, 2007 in connection with related U.S. Appl. No. 10/898,220.

Office Action issued by the U.S. Patent Office on Sep. 6, 2007 in connection with related U.S. Appl. No. 10/843,374.

Notice of Allowance issued by the U.S. Patent Office on Sep. 6, 2007 in connection with related U.S. Appl. No. 10/843,376.

Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 5, 2008 in connection with related U.S. Appl. No. 10/843,375.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
International Preliminary Report on Patentability mailed on Apr. 7, 2009 in connection with PCT application No. PCT/US07/021351, which corresponds to U.S. Appl. No. 11/905/980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
International Search Report and Written Opinion of the International Searching Authority issued on Sep. 1, 2011 in connection with PCT application No. PCT/US2011/035874, which corresponds to U.S. Appl. No. 12/820,227.

Francois Gagnon et al.: "A Hybrid Approach to Operating System Discovery using Answer Set Programming", Integrated Network Management, 2007. IM'07, 10$^{th}$ IFIP/IEEE International Symposium on, IEEE, PI, May 1, 2007, pp. 391-400, XP031182713, ISBN: 978-1-4244-0798-9, p. 293, 394-397.

Final Office Action issued by the U.S. Patent Office on Sep. 14, 2011 in connection with related U.S. Appl. No. 12/230,338.

Office Action issued by the U.S. Patent Office on Oct. 21, 2011 in connection with related U.S. Appl. No. 12/969,682.

Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.

Notice of Allowance issued the by U.S. Patent Office on Oct. 28, 2011 in connection with related U.S. Appl. No. 12/149,196.

Advisory Action issued by the U.S. Patent Office on Nov. 28, 2011 in connection with related U.S. Appl. No. 12/230,338.

Office Action issued by the U.S. Patent Office on Mar. 19, 2012 in connection with related U.S. Appl. No. 12/813,859.

International Search Report and Written Opinion of the International Searching Authority issued on Apr. 25, 2012 in connection with PCT application No. PCT/US2012/021633, which corresponds to related U.S. Appl. No. 13/046,127.

Final Office Action issued by the U.S. Patent Office on May 29, 2012 in connection with related U.S. Appl. No. 12/230,338.

Final Office Action issued by the U.S. Patent Office on Jun. 5, 2012 in connection with related U.S. Appl. No. 12/813,859.

* cited by examiner

PRIOR ART

PRIOR ART

923 SMB FRAME HEADER
925 SMB COMMAND HEADER

1009 DCE/RPC REQUEST HEADER

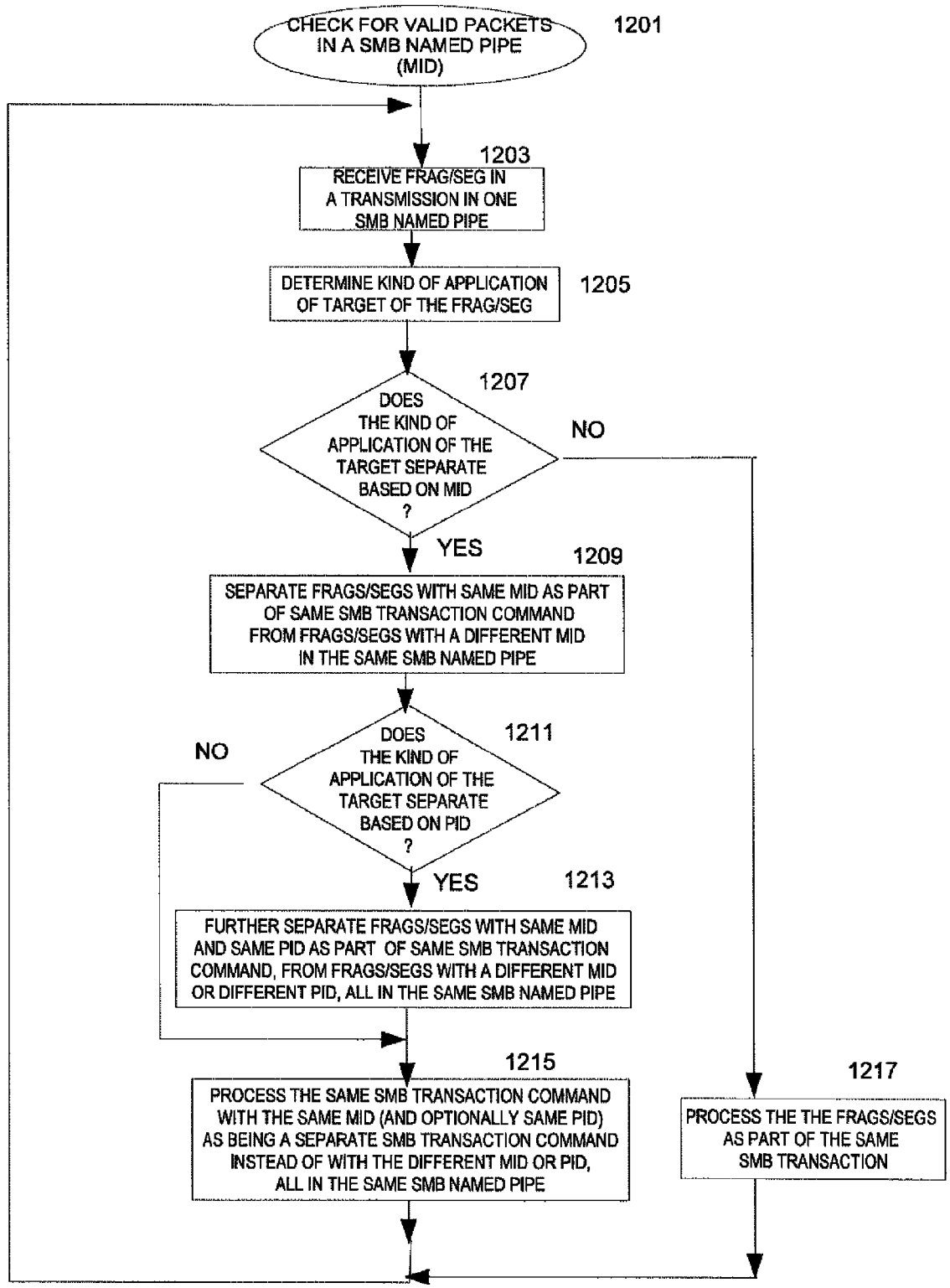

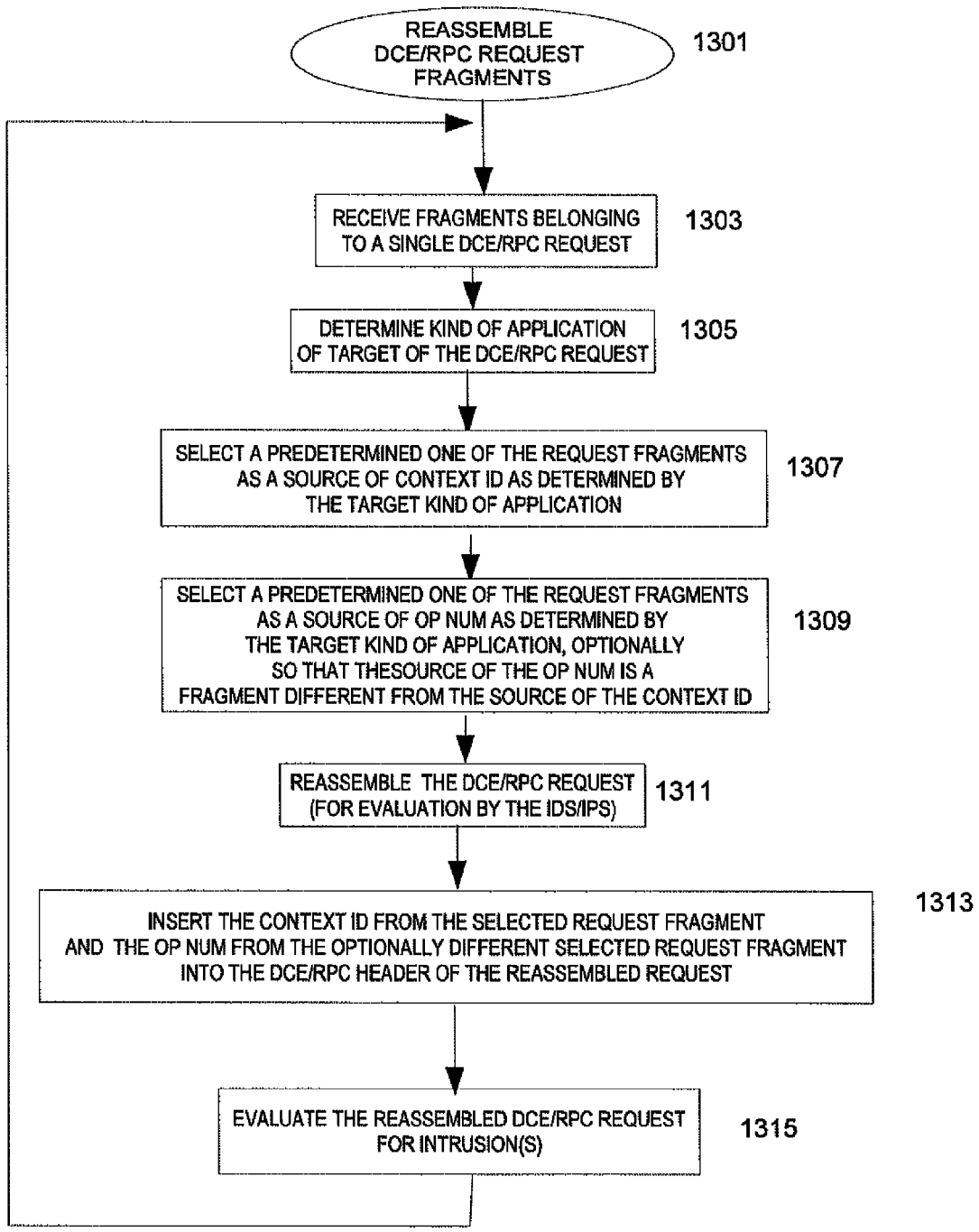

TARGET-BASED SMB AND DCE/RPC PROCESSING FOR AN INTRUSION DETECTION SYSTEM OR INTRUSION PREVENTION SYSTEM

CROSS-REFERENCE TO RELATED APPLICATIONS

This application claims the benefit of the following Provisional applications: 61/103,630 filed Oct. 8, 2008, all of which is expressly incorporated herein by reference.

TECHNICAL FIELD

The present invention relates in general to network traffic analysis, and more specifically to analyzing server message block (SMB) command packets in a SMB named pipe, and analyzing distributed computing environment/remote procedure call (DCE/RPC) request fragments in a DCE/RPC request, optionally in connection with intrusion detection/prevention.

BACKGROUND

An SMB command, which is utilized in packet network communications, can be separated into multiple packets that are sent to the target destination, as part of the same SMB named pipe. The multiple packets can be reassembled by the destination to re-create the original SMB command.

Also, a DCE/RPC request utilized in packet network communications can be separated into request fragments which are sent to the destination, as part of the same DCE/RPC request. Each request fragment still belongs to the original DCE/RPC, and can be reassembled by the destination to re-create the original DCE/RPC request.

The inventor has noted that different kinds of operating systems and/or applications have unique methods of SMB packet reassembly and DCE/RPC fragment reassembly. For example, different WINDOWS™ and SAMBA™ versions handle SMB and DCE/RPC processing differently. These methods of reassembling DCE/RPC request fragments and/or SMB command packets can be exploited by attackers.

The conventional IDS/IPS is not sensitive to these differences, and may reassemble the SMB packets, SMB transaction fragments/segments and/or DCE/RPC request fragments differently than the target destination host. The reassembled SMB command or DCE/RPC request analyzed by the IDS/IPS may be different from the SMB command or DCE/RPC request reassembled by the SMB or DCE/RPC processing at the target destination host. Consequently, an attack that successfully exploits these differences in reassembly can cause the IDS/IPS to miss the malicious traffic. An attacker may use such an evasion to exploit a vulnerability and go unnoticed.

SUMMARY

Accordingly, one or more embodiments of the present invention provide methods, systems, and computer readable memory mediums, in a processor of an intrusion detection/prevention system (IDS/IPS), for checking for valid packets in an SMB named pipe in a communication network. An embodiment includes receiving, in a processor configured as an IDS/IPS, a packet in a transmission and determining a kind of application of a target of the packet in response to receiving the packet. Also provided is including, in the IDS/IPS, the data in the packet as part of the SMB named pipe data inspected by the IDS/IPS as part of the SMB named pipe on only one of a condition that: (a) the FID in an SMB command header of the packet is valid (i) for segments/fragments in the SMB named pipe and (ii) for the determined kind of application of the target of the packet, as indicated by a reassembly table, and (b) the determined kind of application of the target of the packet does not check the FID, as indicated by the reassembly table.

Another embodiment provides methods, systems and computer readable memory mediums, in a processor of an intrusion detection/prevention system (IDS/IPS), for checking for valid packets in an SMB named pipe in a communication network. The embodiment can include receiving, in a processor configured as an IDS/IPS, a fragment/segment, and determining a kind of application of a target of the fragment/segment in response to receiving the fragment/segment. The embodiment also can include separating, in the IDS/IPS, fragments/segments with a same multiplex ID (MID) as part of a same SMB transaction command from fragments/segments with a different MID, the MID being in the SMB frame header, all for fragments/segments in the same SMB named pipe, when a reassembly table indicates that the kind of application of the target separates based on MID. Also, the embodiment can include processing, in the IDS/IPS, the same SMB transaction command with the same MID as being in a separate SMB transaction command instead of with the fragments/segments with the different MID when the kind of application of the target separates based on MID.

Still another embodiment provides methods, systems and computer readable memory mediums, in a processor of an intrusion detection/prevention system (IDS/IPS), for reassembling distributed computing environment/remote procedure call (DCE/RPC) request fragments. The embodiments can include receiving, in a processor configured as an IDS/IPS, plural request fragments belonging to a single DCE/RPC request. Also, the embodiment can include determining, in the IDS/IPS, the kind of application of a target of the DCE/RPC request. Furthermore, the embodiment can include selecting, in the IDS/IPS, one of the request fragments as a source of a context ID depending on the target kind of application as indicated in a reassembly table. Also, the embodiment can include reassembling, in the IDS/IPS, the plural request fragments into a reassembled request. Further, the embodiment can include inserting, in the IDS/IPS, the context ID from the selected request fragment into the context ID of a DCE/RPC header of the reassembled request.

Yet another embodiment provides methods, systems and computer readable memory mediums, in a processor of an intrusion detection/prevention system (IDS/IPS), for reassembling request fragments. The embodiment can include receiving, in a processor configured as an IDS/IPS, plural request fragments belonging to a single request. Also included is determining, in the IDS/IPS, the kind of application of a target of the request. Also included is selecting, in the IDS/IPS, one of the request fragments as a source of an operation number as indicated in a reassembly table depending on the target kind of application. Further included is reassembling, in the IDS/IPS, the plural request fragments into a reassembled request. Also provided is inserting, in the IDS/IPS, the operation number from a DCE/RPC header of the selected request fragment into the operation number of a DCE/RPC header of the reassembled request.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 12 is a flow chart illustrating a process to check for valid packets in an SMB named pipe according to the second embodiment; and FIG. 13 is a flow chart illustrating a process to reassemble DCE/RPC request fragments according to the third and fourth embodiments.

DETAILED DESCRIPTION

Figure 1:
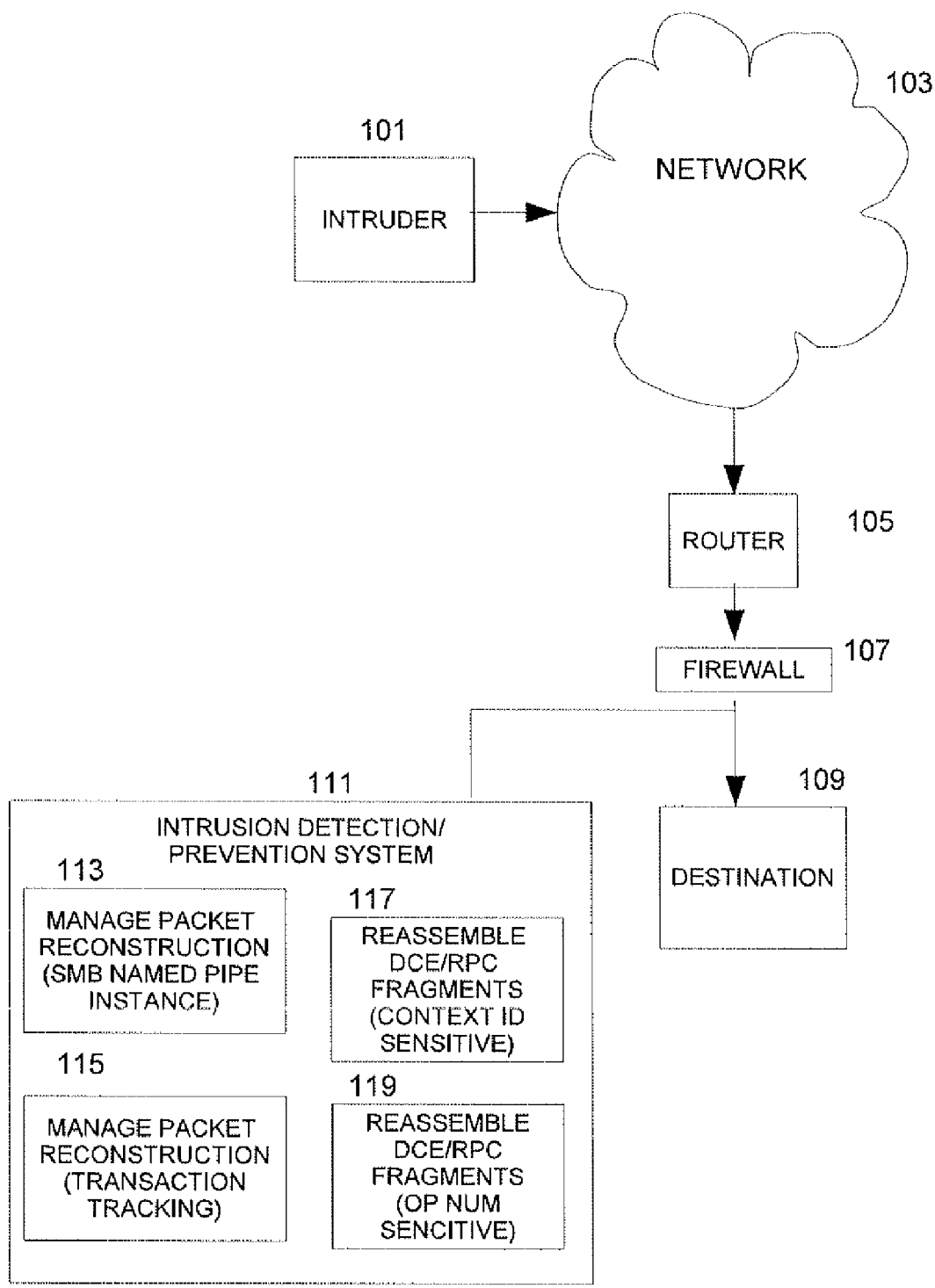
FIG. 1 is a diagram illustrating a simplified and representative environment associated with segment analysis.

In overview, the present disclosure concerns analysis of network traffic on communication networks, often referred to as packet switching networks, which support communication from wireless and/or wire line devices to a destination. Such communication networks may carry SMB commands which have been split at the SMB level into plural packets, and/or DCE/RPC requests which have been split at the DCE/RPC level into variable sized transmission control protocol (TCP) segments. More particularly, various inventive concepts and principles are embodied in systems, devices, and methods therein for analyzing segments, optionally in connection with intrusion detection/prevention systems.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Consider the series of steps in the following example in connection with named pipes:
Login/Authenticate returns UID.
Connect to IPC$ share—returns TID—needs a valid UID
Open named pipe—returns FID—needs a valid UID and TID that opened IPC$ share
Login
Connect to IPC$ share
Open named pipe—say \srvsvc FID1
Open named pipe—say \spoolss FID2
Write to FID1
Write to FID2
Write to FID1
Write to FID2
Write to FID1
Write to FID2
Read from FID1—gets results of data/request sent
Read from FID2—gets results of data/request sent On a very basic level, the IDS/IPS needs to be aware of the different named pipes being written to so that the IDS/IPS does not munge all of the data together. Say an attacker is using FID1 to send an exploit and say the exploit spans two writes:
Write to FID1---|
Write to FID2--->exploit
Write to FID1---|
Write to FID2
Write to FID1
Write to FID2

If the IDS does not separate the data going to each of the named pipes it will likely miss the exploit. It should be separating the data like so:
Write to FID1 Write to FID2
Write to FID1 Write to FID2
Write to FID1 Write to FID2

The UID/TID/FID relationship needs to be understood on a per target basis so an attacker can't slip in invalid data between writes to obscure an attack. Say for the Windows XP case:
Login—UID1
Login—UID2
Connect to IPC$ share using UID1—TID1
Open named pipe using UID1/TID1—FID1

Write to FID1 using UID1/TID1/FID1---|
Write to FID1 using UID2/TID1/FID1--->exploit
Write to FID1 using UID1/TID1/FID1---|

The server will not accept the second write, so the IDS should not include the data in the second write for desegmentation/defragmentation and evaluation.

Now, consider the series of steps in the following example in connection with an SMB transaction:
Login—UID1
Connect to IPC$ share using UID1—TID1
Open named pipe using UID1/T1D1—FID1
Transact—UID1/TID1/FID1 MID1/PID1
Transact—UID1/TID1/FID1 MID2/PID2
Transact Sec—MID1/PID1---|
Transact Sec—MID2/PID2---->exploit
Transact Sec—MID1/PID1---|
Transact Sec—MID2/PID2
Transact Sec—MID1/PID1
Transact Sec—MID2/PID2

The server will collect these segments until the total data for each SMB transaction is sent and then send to the named pipe. The data should be separated like this:
Transact—UID1/TID1/FID1 MID1/PID1
Transact Sec—MID1/PID1
Transact Sec—MID1/PID1
Transact Sec—MID1/PID1
Transact—UID1/TID1/FID1 MID2/PID2
Transact Sec—MID2/PID2
Transact Sec—MID2/PID2
Transact Sec—MID2/PID2

These and other problems in SMB and DCE/RPC processing can be addressed by various embodiments.

Further in accordance with exemplary embodiments, target-based SMB and/or DCE/RPC processing can provide an IDS/IPS the ability to maintain the same state and to reassemble both segmented SMB requests and/or fragmented DCE/RPC requests as does the target destination host. This can preclude evasion attacks since both the IDS/IPS and the destination host are in the same state and reassemble SMB segments and/or DCE/RPC fragments identically.

Referring now to FIG. 1, a diagram illustrating a simplified and representative environment associated with segment analysis will be discussed and described. In the illustration, an intruder 101 (such as a computer system) transmits a transmission to a destination 109. In this example, the transmission is transmitted via a network 103, a router 105, and a firewall 107 to the destination 109. The communications to the destination 109 can be monitored in accordance with well known techniques by an intrusion detection/prevention system 111, such as with a sensor. Although this illustration provides a sensor behind the firewall 107, the sensor can be provided anywhere before the destination 109. Alternatively, the intrusion detection/prevention system 111 can be provided in-line with the destination 109, or can be incorporated into the destination 109.

An SMB command in a transmission can be segmented at the SMB layer into packets or segments (sometimes referred to herein as fragments or fragments/segments) in accordance with known techniques. Also, a DCE/RPC request can be fragment at the DCE/RPC layer into DCE/RPC request fragments. The packets and segments are sent to the destination 109, and the destination 109 reassembles the packets and fragments into the SMB command or DCE/RPC request, as appropriate. The order in which the destination 109 reassembles packets and fragments is a by-product of the SMB layer processing or DCE/RPC layer processing, alone or in combination with the particular operating system on the destination 109. The method in which packets or fragments are reassembled by an application in combination with a particular operating system can be exploited by the intruder 101. Note that although this illustration assumes an intruder 101 sending transmissions or fragments, transmission or fragments that are analyzed can be sent from anywhere.

The illustrated IDS/IPS 111 includes portions for managing 113 packet reconstruction to handle SMB named pipe instance, managing 115 packet reconstruction to handle transaction tracking, reassembling 117 DCE/RPC fragments with context ID sensitivity, and reassembling 119 DCE/RPC fragments with operation number sensitivity (respectively, first, second, third and fourth embodiments). The IDS/IPS can include a combination of one, two, three, or four of the portions 113, 115, 117, 119. Conveniently, the portions 113, 115, 117, 119 can be provided as a preprocessor to the IDS/IPS, that is, to process data before it is evaluated for intrusion.

A first embodiment for processing SMB commands is discussed in connection with FIG. 2 (prior art), FIG. 3, and FIG. 11. A second embodiment for processing SMB commands is discussed in connection with FIG. 4 (prior art), FIG. 5, and FIG. 12. A third embodiment and fourth embodiment for processing DCE/RPC requests are discussed in connection with FIG. 6 (prior art), FIG. 7, and FIG. 13. Each of these embodiments is discussed in detail below.

(First Embodiment)

In accordance with known techniques for an SMB named pipe, a user logs in (is assigned a unique UID), opens a share (is assigned a tree id (TID)), and opens an SMB named pipe (is assigned a file id (FID)). Each of the UID, TID, and FID is unique. The standard SMB header has fields for UID and TID and FID.

Different operating systems and their SMB applications (hereafter, an "OS/application combination") have different requirements for how to open an SMB named pipe for each of these within an SMB session.

In some OS/application combinations, it does not matter what UID or TID or FID is used—in other combinations, the FID matters, and perhaps the UID and/or TID matter. In some OS/application combinations, when a file is opened, it matters whether particular UIDs and TIDs are used when that FID is opened—others, not. It is ultimately the SMB layer on the target of the SMB request that handles the SMB request. For Windows, because Windows is closed source it unknown whether it is the kernel or a separate application that handles the SMB layer, such as a service host. In LINUX or UNIX, Samba is in an application layer. The present inventor noticed that different applications respond differently to the same UID, TID and FID in an SMB request.

An IDS/IPS traditional includes a preprocessor which formats the data before being evaluated for intrusions, among other things. One of the main purposes of the preprocessor is to do defragmentation, including deciding which named pipe instance a fragment belongs to.

With SAMBA 3.0.22 (as an example), the SMB request only needs the FID (without regard to UID and TID) to always get the same pipe instance.

So, as packets are coming in, one needs to know which named pipe the packet is going to be handled as in the target system in order to properly reassemble and evaluate fragments and packets for different kinds of OS/application combinations. (Both fragments or segments are split into fragmented or segmented packets at the application layer (unlike handling of IP fragments and TCP segments).

The key: as a target system is connected up, some combination of the UID, TID and/or FID may have to be specified, or not, depending on the OS/application combination at the target. It can be important to be able to identify whether or not a particular access is valid, as connections and transactions are tracked that go across that named pipe.

Figure 2:
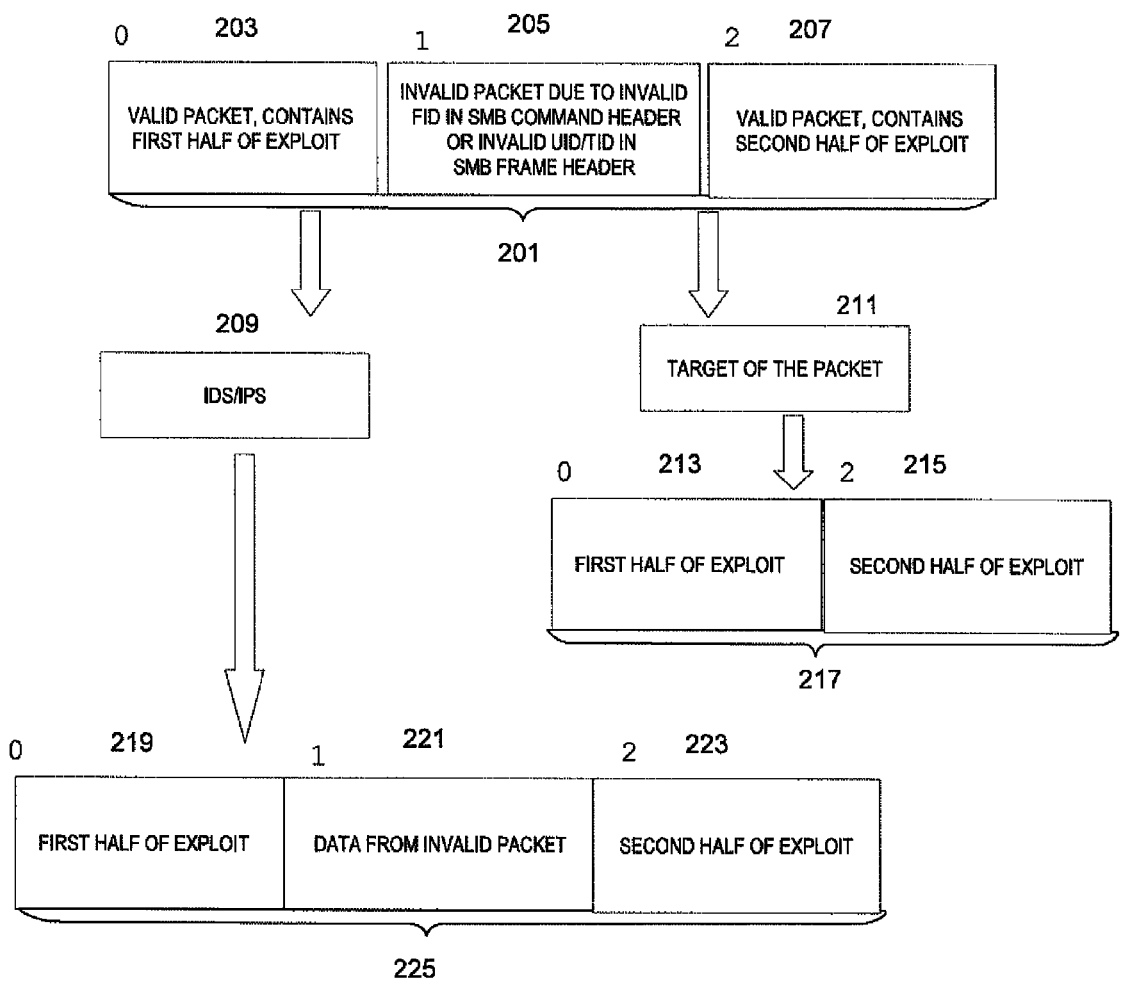
FIG. 2 is a diagram illustrating a prior art SMB named pipe processing.

Referring now to FIG. 2, a diagram illustrating a prior art SMB named pipe processing will be discussed and described. This illustrates an evasion example: someone sends a FRAG1 (valid packet 203, which contains first half of exploit), FRAG2 (invalid packet 205 due to incorrect FID which will be ignored by the application on predetermined kinds of OS/application combinations of the target 211), and FRAG3 (valid packet 207, which contains second half of exploit). Each of these is on the same named pipe 201. Without this invention, the IDS/IPS sees all three fragments/packets 219, 221, 223 on a named pipe 225, whereas the target operating system sees only FRAG1 and FRAG3, which have the first half of exploit 213 and second half of exploit 215, together creating an exploit 217. The IDS then misses the attack or falsely alerts since the exploit spans FRAG1 and FRAG3, in this example with an intervening packet 205.

A first embodiment can improve the handling of SMB. A lookup table for SMB named pipe reassembly can be included in the IDS/IPS or its preprocessor, for the combination of OS/application targeted by the SMB request. The OS/Application combination (e.g., Windows 2003) can be looked up and returned by known technology. The lookup table can contain indications of how to process FID, and/or FUD/UID/TID, and even whether or not to check the FID/UIS/TID for each of predetermined OS/application combinations. The IDS/IPS or its preprocessor accordingly can flexibly and accurately handle SMB commands targeted to different OS/application combinations.

The SMB packet is received, and based on its IP address the OS/application (e.g., WINDOWS VISTA) is returned, and then the table is referenced for checking the FID, and/or FID/UID/TID based on the IP address. The named-pipe processing makes sure that the FID (in the appropriate context of the UID and TID, i.e., if required by the OS/application that is processing the SMB request) is valid for the segments/fragments. The lookup table can be set up which stores the UID and TID used to open the FID. Thus, after the pipe is open, checking can be done as to whether the FID is valid, given the UID and TID, further depending on the application on the target that is processing the SMB request.

As a concrete example, for UID, the system can check whether there was a valid login. Also, the system can check whether UID and TID in the request previously were used to open the named pipe, for example, Windows Vista. There are different requirements depending on the OS/application combination at the target as to whether or not the request is valid.

Figure 3:
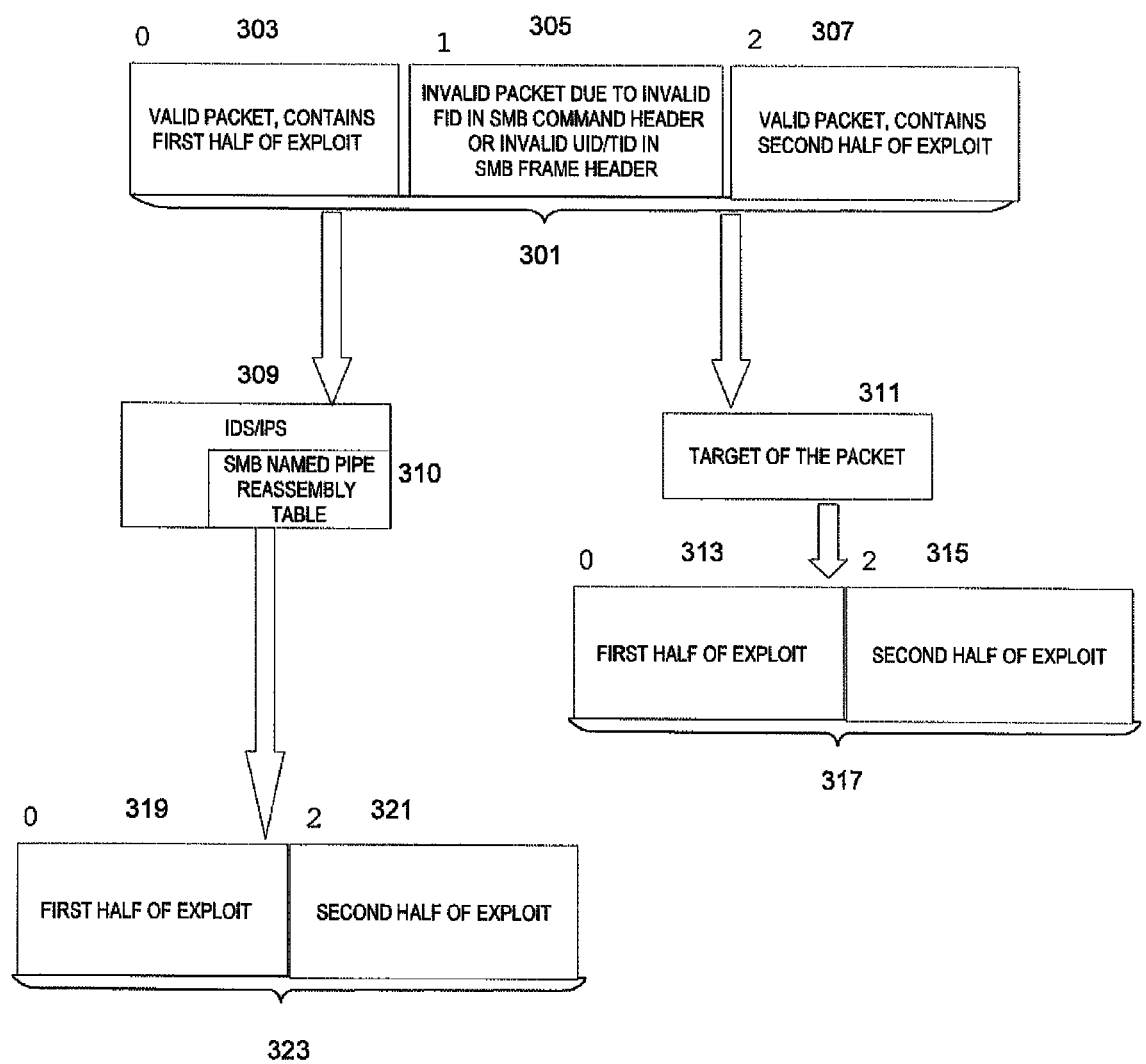
FIG. 3 is a diagram illustrating target-based SMB processing according to a first embodiment.

Referring now to FIG. 3, a diagram illustrating target-based SMB processing according to a first embodiment will be discussed and described. FIG. 3 can be compared to FIG. 2 (prior art) to appreciate the more effective result. FIG. 3 illustrates a failed evasion example: a valid packet 303 contains first half of exploit, a packet 305 which is invalid due to incorrect FID, and a valid packet 307 contains second half of exploit. Each of these is on the same named pipe 301. The IDS/IPS 309 determines the kind of application of the target of the packet, and determines whether the application has special handling for packets with FID, UID, and/or TID and what that handling is, for example by referring to the SMB named pipe reassembly table 310. In the present example, the named pipe reassembly table for the present target system indicates that FID is checked, and a fragment with incorrect FID is not included as part of the data for the named pipe. (For other target systems, the named pipe reassembly table indicates that packets with an invalid FID are not ignored, or that packets with an invalid UID and/or TID are not included as part of the data for the named pipe. The information in the table is predetermined to match SMB handling of different kinds of applications.) The valid packets 303, 307 are included as data in the SMB named pipe 323. Since the invalid packet 305 is not included as part of the data for the SMB named pipe, the IDS/IPS evaluates the two fragments 319, 321 as data in the SMB named pipe 323. In this example, both the IDS/IPS and the target see only the two valid packets 319, 321, 313, 315, which have the first half of exploit and second half of exploit, together creating an exploit. The IDS then accurately notes the exploit that spans the first and third packets 303, 307.

(Second Embodiment)

The second embodiment further considers the effect of the PID (process ID) and/or MID (multiplex ID) on the reassembly of SMB fragments/segments into SMB transaction commands by the IDS/IPS prior to the evaluation of the transaction commands by the IDS/IPS.

The transaction command, such as an SMB command, writes data to the named pipe. The MID and PID fields are important if the transaction is segmented. The application at the target needs to keep track of the secondary transaction commands' MID and PID to make sure the segment is being put into the right place.

A transaction SMB command causes the data to be written to the named pipe only when all of the segments are received by the target. An attacker can interleave an exploit with the secondary transaction commands. Segments for different transaction commands can be interleaved. The MID and PID fields indicate which transaction the segments belong to. In a typical transaction, none of the data is written to the pipe until all of the segments are gotten by the server. If two transactions are going at the same time, the IDS/IPS can more accurately identify intrusion events if it knows which transaction the segments belong to.

At the source end of the named pipe is the DCE/RPC processor.

Figure 4:
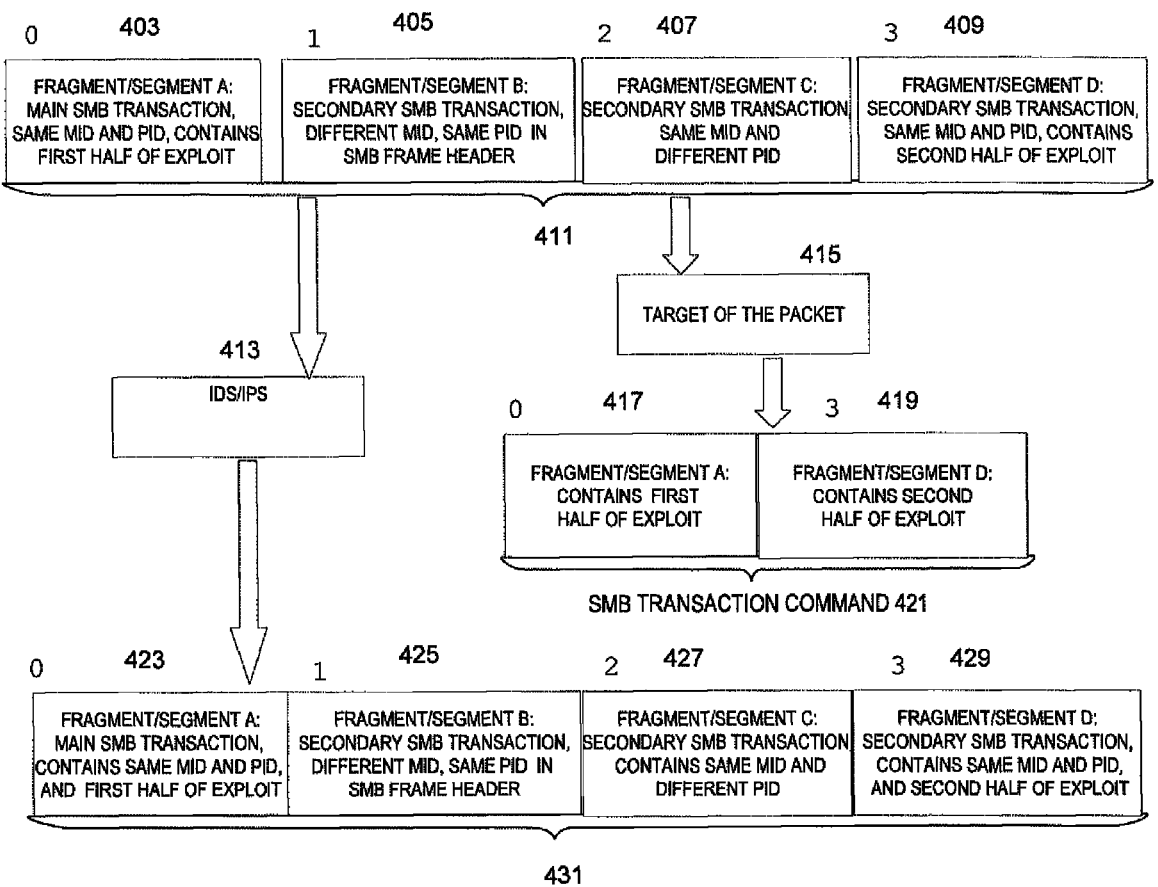
FIG. 4 is a diagram illustrating another prior art SMB transaction command processing.

Referring now to FIG. 4, a diagram illustrating another prior art SMB transaction command processing will be discussed and described. This illustrates an evasion example: FRAGA 403 (main SMB transaction, with same MID and PID, which contains first half of exploit), FRAGB 405 (secondary SMB transaction, with an MID different from FRAGA 403 but the same PID in the SMB frame header), FRAGC 407 (secondary SMB transaction, with the same MID as FRAGA 403 but a different PID in the SMB frame header), and FRAGD 409 (secondary SMB transaction with the same MID and PID as FRAGA 403, which contains the second half of the exploit). Each of these is on the same named pipe 411. The conventional IDS/IPS 413 sees the data in all four fragments/packets 423, 425, 427, 429 as belong to one or more transaction commands 431, whereas the target operating system sees only FRAGA and FRAGD, which contain the first half of exploit 417 and second half of exploit 419, together creating an SMB transaction command 421 with an exploit. The conventional IDS/IPS then misses the attack or falsely alerts since the exploit spans FRAGA and FRAGD in this example, with intervening packets 405, 407.

A second embodiment can improve the handling of SMB. A lookup table for SMB transaction reassembly can be included in the IDS/IPS or its preprocessor, for the combination of OS/application targeted by the SMB request. The OS/Application combination (e.g., Windows 2003) which is on the target can be looked up and returned by known technology. The lookup table can contain predetermined indications of how to separate fragments/segments in the same SMB named pipe and collect them into SMB transaction commands, based on the MID and/or PID, for each of predetermined OS/application combinations. The IDS/IPS or its preprocessor accordingly can flexibly and accurately evaluate SMB transactions which are targeted to different OS/application combinations.

The SMB fragment/segment is received, and based on its IP address the OS/application (e.g., WINDOWS VISTA) is returned, and then the table is referenced for checking the MID and/or PID based on the OS/application of the target. The table can indicate whether the kind of OS/application separates fragments/segments with a different MID and/or PID into different SMB transaction commands.

Figure 5:
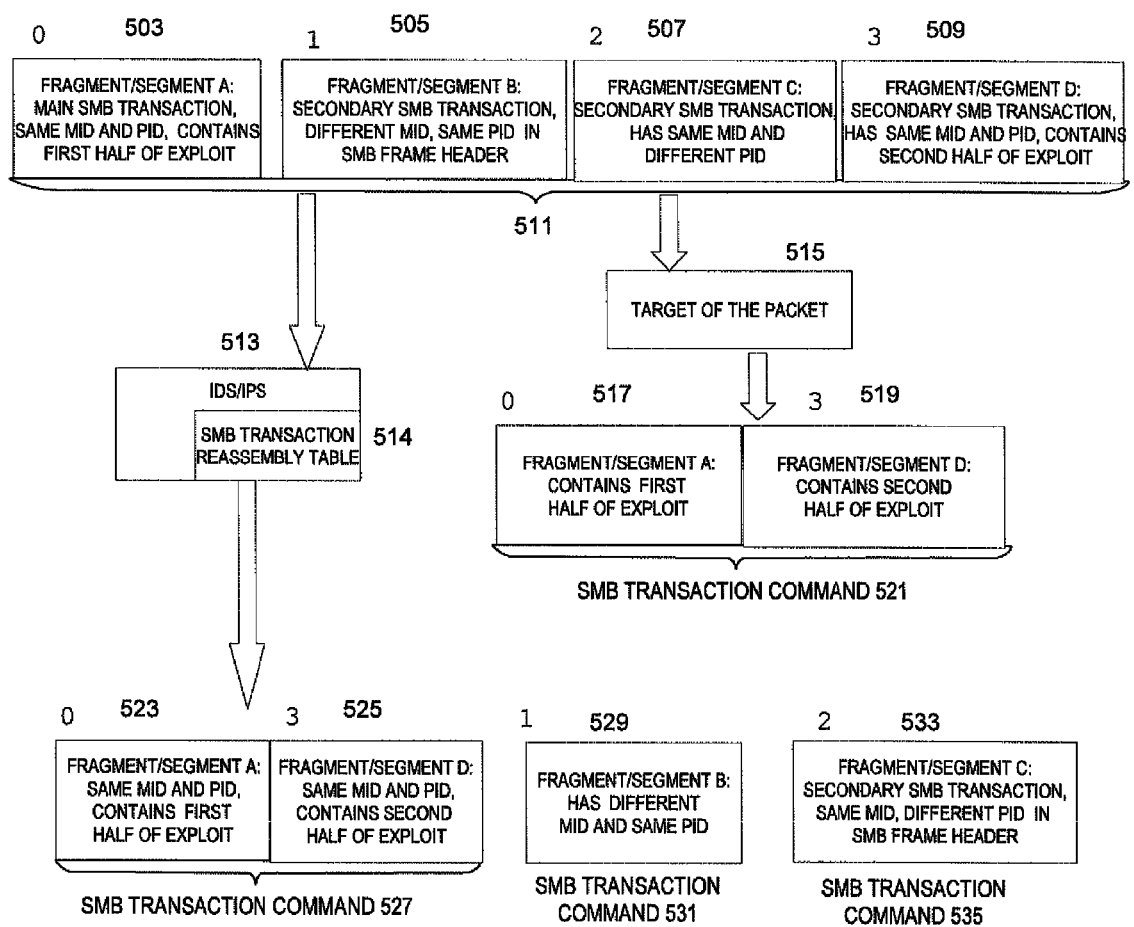
FIG. 5 is a diagram illustrating target-based SMB processing according to a second embodiment.

Referring now to FIG. 5, a diagram illustrating target-based SMB processing according to a second embodiment will be discussed and described. In FIG. 5, the data in the SMB transaction command are reassembled for evaluation by the IDS/IPS just as it is assembled by the target. Furthermore, by referencing the SMB transaction reassembly table 514 to determine whether to sort the fragments by MID, and whether to further sort the fragments by PID, the single IDS/IPS 513 can accurately evaluate SMB transactions transmitted to different kinds of OS/application combinations which reassemble the data in the fragments differently from each other.

Compare FIG. 4 to FIG. 5, with the same evasion example: FRAGA 503 (main SMB transaction, with same MID and PID, which contains first half of exploit), FRAGB 505 (secondary SMB transaction, with an MID different from FRAGA 503 but the same PID in the SMB frame header), FRAGC 507 (secondary SMB transaction, with the same MID as FRAGA 503 but a different PID in the SMB frame header), and FRAGD 509 (secondary SMB transaction with the same MID and PID as FRAGA 503, which contains the second half of the exploit). Each of these is on the same named pipe 511. In FIG. 5, the IDS/IPS 513 determines the kind of application of the target of the packet, and determines whether the kind of application has special handling for packets in the same SMB named pipe with MID and/or PID and what that handling is, for example by referring to the SMB transaction reassembly table 514. In the present example, the SMB transaction reassembly table 514 for the present target system indicates that fragments/segments are processed in the same SMB transaction command when they have the same MID and same PID. (For other target systems, the SMB transaction reassembly table can indicate that the MID and PID are not used for grouping fragments/segments into a single SMB transaction command, or that the MID (but not PID) is used for grouping.) FRAGA 523 and FRAGD 525 have the same MID and PID, and therefore the IDS/IPS 513 using the SMB transaction reassembly table 514 considers them to belong to a single SMB transaction command 527. FRAGB 529 and FRAGC 533 are included as data in the SMB transaction command 527. Since the fragment/segments with either a different MID or different PID are not included as part of the SMB transaction command 527 analyzed by the IDS/IPS 513, both the IDS/IPS and the target see the same SMB transaction command 527, 521, which has the first half of exploit and second half of exploit, together creating an exploit. The IPS/IDS 513 then accurately notes the exploit that spans FRAGA 503 and FRAGD 509.

(Third Embodiment)

The third embodiment further considers the effect of the context ID on the reassembly of DCE/RPC request fragments into DCE/RPC requests by the IDS/IPS prior to the evaluation of the DCE/RPC requests by the IDS/IPS.

Every DCE/RPC request has a context ID in the DCE/RPC header which is a handle that refers to the interface to which the request is made. If the request is fragmented, each fragment has only a part of the request; each fragment also has a context ID. The fragments are put back together to reassemble the DCE/RPC request. Although the fragments each include a context ID, only one of the fragments needs to have the context ID for the target application to put the fragments back together into the reconstituted request. However, the fragment that the target application selects from which to obtain the context ID is dependent on the target OS/application. For example, WINDOWS(SM) obtains the context ID from the first fragment, but SAMBA contrarily uses the last fragment. The present inventor has performed tests and observed that the fragment to select as providing the source of the context ID varies according to the recipient OS/application. Hence, it can be important to select the context ID from a correct one of the fragments so as to better emulate the target.

The context ID is a known field in the DCE/RPC request header. However, there is no standard which dictates the fragment to use for obtaining the context ID for a reassembled DCE/RPC request.

The context ID identifies a collection of functions for remote procedure calls. In comparison to embodiment 4 (discussed below), the operation number (sometimes referred to as an opnum) identifies a function within that collection of functions. Together, the context ID and operation number identify the service and the function within that service that is being called. By using a context ID and/or operation number as used by the target, the IDS/IPS can determine whether that data in the remote procedure call will exploit a particular vulnerability within that service. If the IDS is not tracking the context ID that is used by the OS/application, then it will not put fragments together the same as the target OS/application (a so-called "DCE/RPC exploit").

Consider a DCE/RPC exploit spanning a couple of fragments in a DCE/RPC request. The exploit is based on the function call within that service. If the IDS/IPS uses the wrong context ID, then the IDS/IPS is checking a non-existent service or wrong service to identify the exploit, which then could go unnoticed.

The IDS/IPS gathers together the request fragments. If the target is Windows, for example, then the first fragment is stored with its context ID as being the correct context ID. Later, when all of the fragments are reassembled and the request header is added (according to known techniques), the fragment which is the source of the context ID stored into the request header of the reassembled packet, is predetermined and selected based on the recipient OS/application since the fragment the context ID comes from varies depending on the target OS/application.

The third and/or fourth embodiments can be implemented with SMB processing or even TCP connection/non-SMB.

Figure 6:
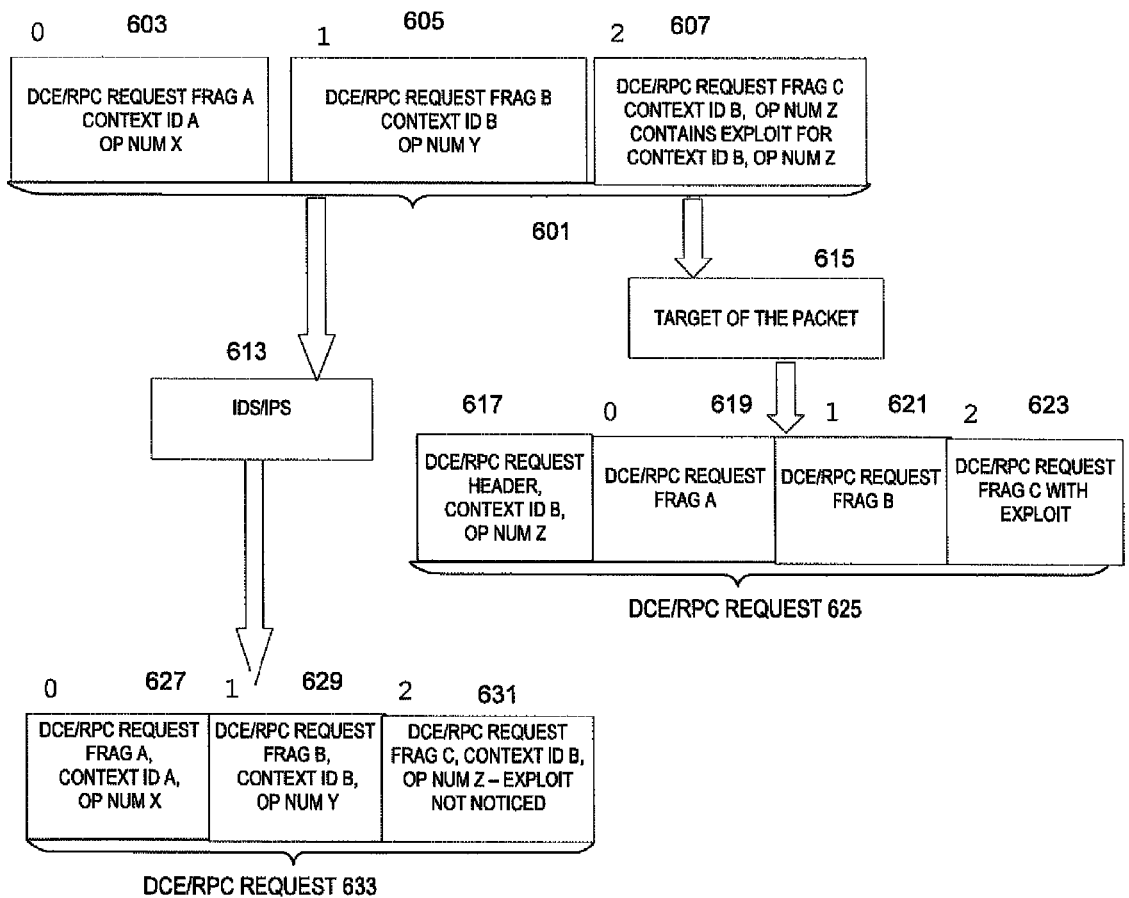
FIG. 6 is a diagram illustrating a prior art DCE/RPC processing.

Referring now to FIG. 6, a diagram illustrating a prior art DCE/RPC processing will be discussed and described. This also illustrates an evasion example: DCE/RPC Request FRAG A 603 (context ID A, and op num X), DCE/RPC Request FRAG B 605 (context ID B, op num Y), and DCE/RPC Request FRAGC 607 (context ID B, op num Z, and an exploit for context ID B, op num Z). Each of these belongs to a single DCE/RPC request 601. The conventional IDS/IPS 613 interprets the fragments as belonging to a single DCE/RPC request 633 and hence does not evaluate the contents of the fragments the same as the target 615. The target OS/application in this application interprets operating system sees FRAGA 619, FRAG B 621, and FRAG C 623, together in a DCE/RPC request 625 with a DCE/RPC request header using context ID B and op num Z (from last fragment). The service and function call for context ID B and op num Z are vulnerable to the exploit which was not noticed by the IDS/IPS because the conventional IDS/IPS did not evaluate the context ID and op num from the same fragment as the target.

A third embodiment can improve the handling of DCE/RPC request fragments. A lookup table for DCE/RPC context ID (and in some embodiments, a separate lookup table for DCE/RPC op num reassembly) and can be included in the IDS/IPS or its preprocessor, for the combination of OS/application targeted by the DCE/RPC request. The concept of the look table is discussed above. The IDS/IPS or its preprocessor accordingly can flexibly and accurately evaluate DCE/RPC requests reconstructed from fragments.

Figure 7:
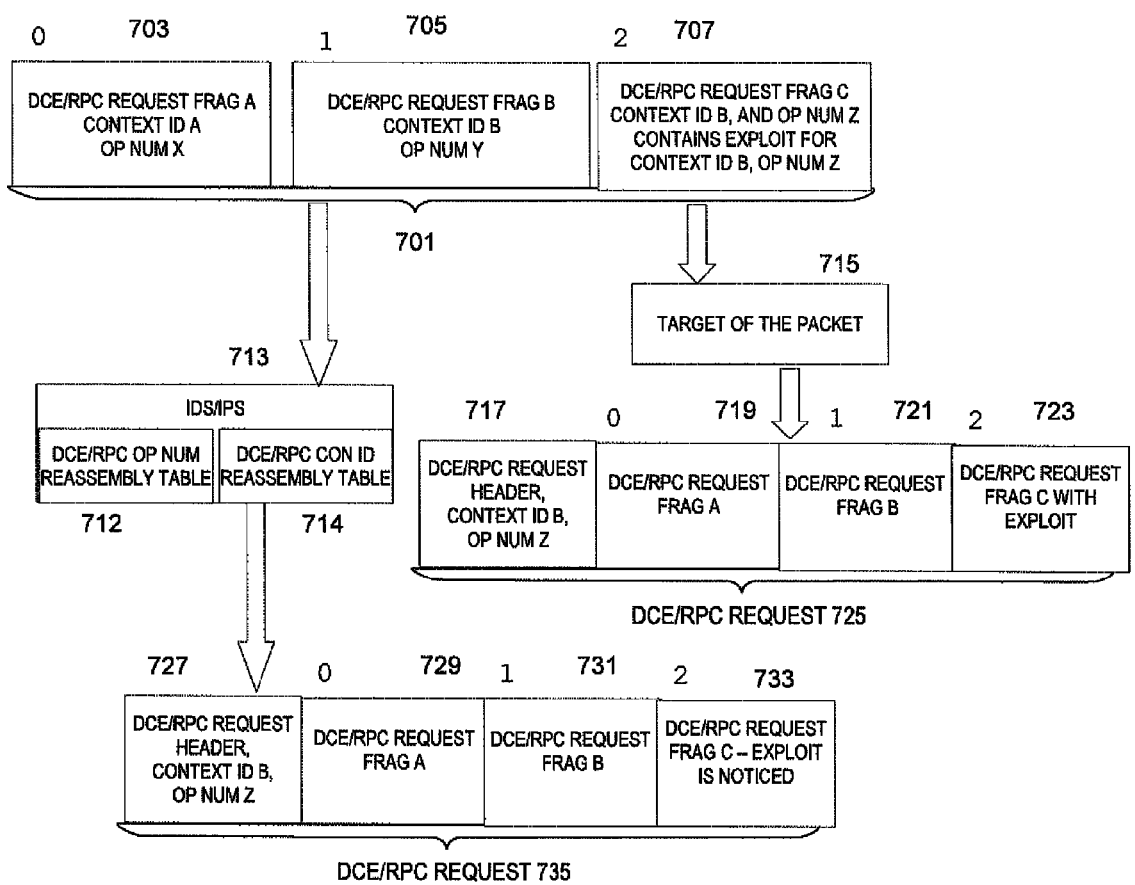
FIG. 7 is a diagram illustrating target-based DCE/RPC processing according to a third and fourth embodiment.

Referring now to FIG. 7, a diagram illustrating target-based DCE/RPC processing according to a third and fourth embodiment will be discussed and described. In FIG. 7, the fragments FRAG A 703, FRAGB 705, FRAGC 707 in a single DCE/RPC request 701 are reassembled into a DCE/RPC request for evaluation by the IDS/IPS 701 just as it they assembled by the target 715. Furthermore, by referencing the DCE/RPC context ID reassembly table 714 to select which fragment to use as the source of the context ID, the IDS/IPS 713 can prepare DCE/RPC request headers with accurate context IDs, despite the DCE/RPC requests being transmitted to different kinds of OS/application combinations. Use of a DCE/RPC operation num reassembly table 712 similarly results in preparing the DCE/RPC request headers with accurate operation numbers.

Compare FIG. 6 to FIG. 7, with the same evasion example: DCE/RPC Request FRAG A 703 (context ID A, and op num X), DCE/RPC Request FRAG B 705 (context ID B, op num Y), and DCE/RPC Request FRAGC 707 (context ID 13, op num Z, and an exploit for context ID B, op num Z). Each of these belongs to a single DCE/RPC request 701. The IDS/IPS 713 references the DCE/RPC context ID reassembly table to select which of the fragments is the source of the context ID in the header for the reassembled DCE/RPC request. Because the header of the reassembled DCE/RPC request 735 which is evaluated by the IDS/IPS has the same context ID as the header 717 of the DCE/RPC request 725 at the target 715, the IDS/IPS can notice a DCE/RPC exploit.

(Fourth Embodiment)

The fourth embodiment further considers the effect of the operation number on the reassembly of DCE/RPC request fragments into DCE/RPC requests by the IDS/IPS prior to the evaluation of the DCE/RPC requests by the IDS/IPS. The fourth embodiment is similar to the third embodiment, except that the operation number is referenced instead of the context ID. Hence, most of the discussion of the third embodiment is not repeated here.

The context ID and operation number can be obtained from different fragments, depending on the kind of target. For example, for the context ID, all Windows versions use the first fragment as the source of the context ID, but for the operation number, only Windows Vista uses the first fragment as the source of the context ID.

Figure 8:
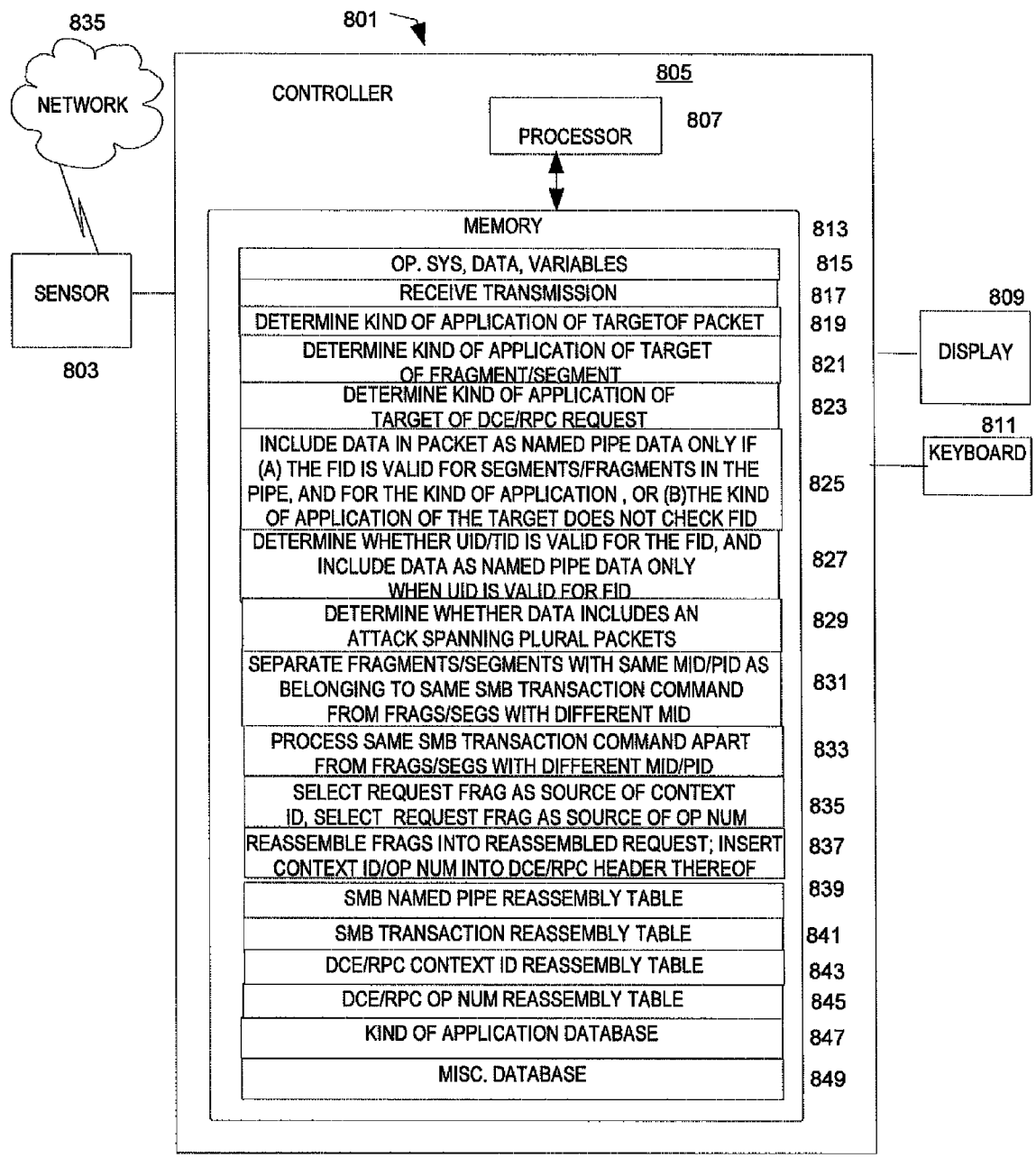
FIG. 8 is a block diagram illustrating portions of an exemplary computer system.

Referring now to FIG. 8, a block diagram illustrating portions of an exemplary computer system 801 will be discussed and described. The computer system 801 may include one or more controllers 805, which can receive signals from a sensor 803 which senses communications from a network 835 in accordance with known techniques, where the communications are being sent to a target (not illustrated). The controller 805 can include a processor 807, a memory 813, an optional display 809, and/or an optional user input device such as a keyboard 811.

The processor 807 may comprise one or more microprocessors and/or one or more digital signal processors. The memory 813 may be coupled to the processor 807 and may comprise a read-only memory (ROM), a random-access memory (RAM), a programmable ROM (PROM), and/or an electrically erasable read-only memory (EEPROM). The memory 813 may include multiple memory locations for storing, among other things, an operating system, data and variables 815 for programs executed by the processor 807; computer programs for causing the processor to operate in connection with various functions such as receiving 817 a transmission, determining 819 a kind of application of the target of the transmission, determining 821 a kind of application of the target of the fragment/segment, determining 823 a kind of application of the target of a DCE/RPC request, including 825 data in the packet as named pipe data in certain predetermined situations, determining 827 whether the UID/RID is valid for the FID, and excluding the data from the named pipe data when the UID and/or TID is invalid for the FID, determining 829 whether the data includes an attack spanning plural packets, separating 831 fragments/segments by MID/PID, processing 833 the same SMB transaction command apart from fragments/segments with a different MID/PID, selecting 835 a predetermined one of the request fragments as the source of context ID and selecting a predetermined one of the request fragments as a source of the operating number, reassembling 837 the fragments in a reassembled request, and/or other processing; an SMB named pipe reassembly table 839, an SMB transaction reassembly table 841, a DCE/RPC context ID reassembly table 843, a DCE/RPC operation number reassembly table 845; a kind of application database 847; and a database 849 for other information used by the processor 807. The computer programs may be stored, for example, in ROM or PROM and may direct the processor 807 in controlling the operation of the computer system 801.

The processor 807 optionally may be programmed for receiving 817 a transmission. In the illustrated example, fragments or packets are detected by the sensor 803 connected to the computer system 801 and are supplied to the computer system 801 in accordance with known techniques.

The processor 807 may be programmed for determining 819 a kind of application associated with the target of the packet, determining 821 a kind of application of the target of the fragment/segment, and for determining 823 a kind of application associated with the target of the DCE/RPC request. In the typical situation, the packet or fragment identifies the target, for example as a destination IP address found in the packet header. A kind of application database 847 or table can be maintained for known destinations, which indicates the kind of application associated with a particular target. The kind of host database or table is intended to distinguish between applications and/or operating systems that reassemble segments differently for SMB named pipe processing, for SMB commands, and/or for DCE/RPC requests. Advantageously, a reassembly table or database can indicate whether and how fragments are assembled (such as the order of assembly and whether data in a packet with an invalid FID, TID and/or UID is included in the SMB named pipe data or not). In the illustrated example, the SMB named pipe reassembly table 839 includes two or more fragment reassembly patterns, which can be indexed, for example by the kind of application.

The data can be provided, for example, by parsing the received fragments or packets, by accumulating data from the fragments or packets in storage in the order, or by data from the fragments or packets being provided as input for another process (for example the intrusion detection/prevention unit).

The processor 807 may be programmed for including 825 data in the packet as named pipe data for certain predetermined applications. The data can be included, for example, by accumulating data from the fragments or packets in storage if the reassembly table indicates that it is added, or by data from the fragments or packets being provided as input for another process (for example the intrusion detection/prevention unit).

The processor 807 may be programmed for determining 827 whether the UID/RID is valid for the FID, and excluding the data from the named pipe data when the UID and/or TID is invalid for the FID. Examples are discussed herein.

The processor 807 may be programmed for determining 829 whether the data includes an attack spanning plural packets. Examples are discussed herein.

The processor 807 may be programmed for separating 831 fragments/segments by MID/PID. Examples are discussed herein The processor 807 may be programmed for processing 833 the same SMB transaction command apart from fragments/segments with a different MID/PID. Examples are discussed herein.

The processor 807 may be programmed for selecting 835 a predetermined one of the request fragments as the source of context ID and selecting a predetermined one of the request fragments as a source of the operation number. Examples are discussed herein.

The processor 807 may be programmed for specifically reassembling 837 the fragments in a reassembled request, and inserting the context ID and operation number into the DCE/RPC header which is added to the reassembled request before it is evaluated by the IDS/IPS for an intrusion. The reassembling can be done by, for example, storing the data from the fragments, in the order, in a storage location, to recreate the transmission. The recreated transmission can be provided for further processing, for example, to the intrusion detection/prevention unit.

An optional intrusion detection/prevention unit (not illustrated) can be included in the processor 807 can be programmed in accordance with known techniques, to evaluate whether the packets or fragments (properly assembled to match the behavior of the target) suggest an attempted intrusion.

The processor 807 may be programmed for various reassembly tables 839, 841, 843, 845. The reassembly tables 839, 841, 843 can be provided for implementing the different reassembly patterns. One or more of the reassembly tables 839, 841, 843, 845 alternatively can be stored in a remote database and accessed as needed.

The processor 807 may be programmed for a kind of application database 847. The kind of application database 847 can be maintained for known destinations, to indicate the kind of application associated with a particular destination. Optionally, the kind of application database 847 can be maintained remotely, and relevant kind of application information can be downloaded as needed. Optionally, the kind of application can be indicated in a table rather than a database.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 9:
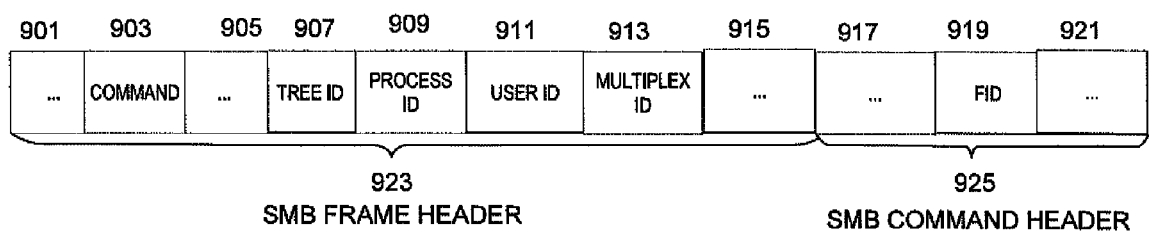
FIG. 9 is a block diagram illustrating portions of an SMB frame header and an SMB command header.
Figure 10:
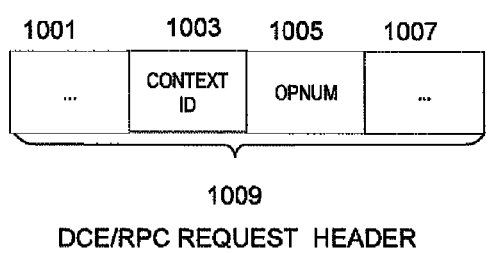
FIG. 10 is a block diagram illustrating portions of a DCE/RPC request header.

FIG. 9 and FIG. 10 are included to summarize SMB fields (FIG. 9) and DEC/RPC fields (FIG. 10) that are referenced by one or more embodiments. The format of SMB commands and DCE/RPC requests are well understood in the art.

Referring now to FIG. 9, a block diagram illustrating portions of an SMB frame header 923 and an SMB command header 925 will be discussed and described. The SMB frame header 923 includes standard fields for a tree ID (TID) 907, a process ID (PID) 909, a user ID (ID) 911, and a multiplex ID (MID) 913. The SMB command header 925 follows the SMB frame header 923. If a command field 903 in the SMB frame header requires a FID, the FID 919 is included as a field in the SMB command header 925. The FID 919 is in the SMB command header 925 (for an SMB command, such as write next, or transact, and other types of SMB write command). Other fields 903, 915, 919, 921 typically are included in the SMB frame header 923 and SMB command header 925.

Referring now to FIG. 10, a block diagram illustrating portions of a DCE/RPC request header 1009 will be discussed and described. The DCE/RPC request header 1009 includes standard fields for context ID 1003 and operation number 1005. Other fields 1001, 1007 are typically included in the DCE/RPC request header 1009.

Figure 11:
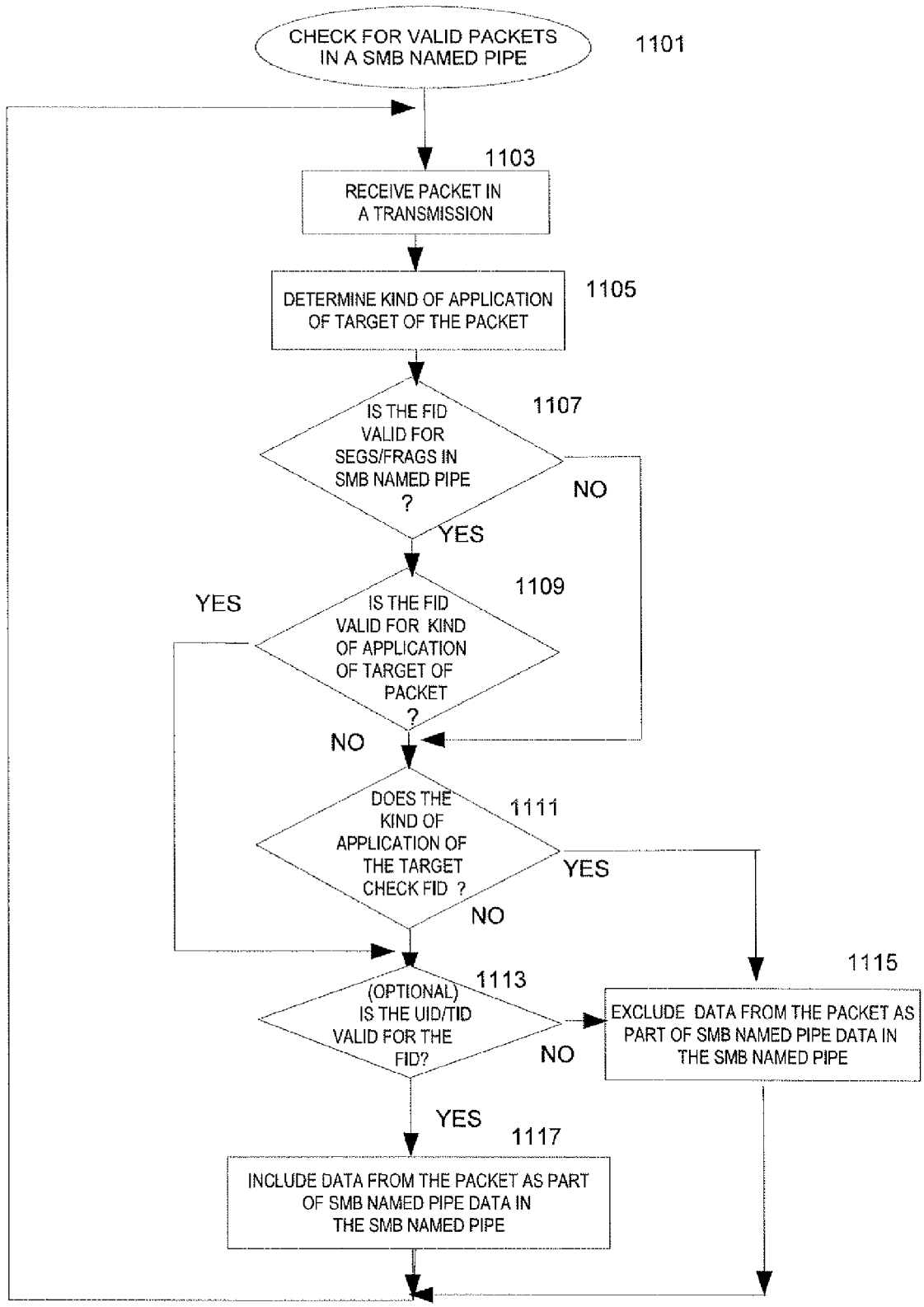
FIG. 11 is a flow chart illustrating a process to check for valid packets in an SMB named pipe according to the first embodiment.

FIG. 11, FIG. 12 and FIG. 13 are flow charts of procedures for analyzing SMB transmissions or DCE/RPC requests. FIG. 11 illustrates a procedure for checking for valid packets in an SMB named pipe using FID/UID/TID, FIG. 12 illustrates a process for checking for valid packets in an SMB named pipe using MID/PID, and FIG. 13 is an illustration of reassembling DCE/RPC request fragments while sensitive to a context ID and/or operation number. These procedures can advantageously be implemented on, for example, a processor of a controller, described in connection with FIG. 8 or other apparatus appropriately arranged. Although these are illustrated as separate procedures, it will be appreciated that the procedures of FIG. 11, FIG. 12 and FIG. 13 can be combined. FIG. 11, FIG. 12 and FIG. 13 are discussed in more detail below.

Referring now to FIG. 11, a flow chart illustrating a process 1101 to check for valid packets in an SMB named pipe according to the first embodiment will be discussed and described. In overview, the process 1101 includes receiving 1103 a packet in a transmission, determining 1105 a kind of application of the target of the packet, judging 1107 whether the FID is valid for the segments/fragments in the SMB named pipe, judging 1109 whether the FID is valid for the kind of application of the target of the packet, judging 1111 whether the kind of application of the target checks the FID, judging 1113 whether the UID/TID is valid for the FID, excluding 1115 data within the packet from the SMB named pipe data in the SMB named pipe, and including 1117 data from the packet as part of the SMB named pipe data in the SMB named pipe. These are described below, however, details that have previously been described are omitted.

The process 1101 can receive 1103 a packet in a transmission. The packet is received at the IDS/IPS. Because the packet is being evaluated by the IDS/IPS, the IDS/IPS will attempt to evaluate the packet as it will be interpreted by the target. Therefore, the process 1101 can determine 1105 a kind of application of the target of the packet. For example, the IP address of the target can be used to determine the kind of application/OS combination which is used on the target using known techniques.

So that the IDS/IPS will accurately simulate how the application/OS interprets data in the packets, data in the packets is included as part of the SMB named pipe data which the IDS/IPS inspects only if (A) the FID in the SMB command header of the packet is valid for both the segments/fragments in the SMB named pipe and for the determined kind of application of the target of the packet; or if (B) the kid of application of the target of the packet does not check the FID. Thus, the process 1101 can judge 1107 whether the FID is valid for the segments/fragments in the SMB named pipe, and can judge 1109 whether the FID is valid for the kind of application of the target of the packet. Also, the process 1101 can judge 1111 whether the kind of application of the target checks the FID. Because the data is included in the SMB named pipe data only when the FID is valid for the particular kind of application of the target, or when the target is of the kind that does not check the FID, the SMB named pipe data inspected by the IDS/IPS more accurately simulates the SMB named pipe data at the target. Effectively, the process can exclude 1115 data from the packet as part of the SMB named pipe data and can include 1117 data from the packet as part of the SMB named pipe data which is inspected by the IDS/IPS.

Optionally, the process 1101 can judge 1113 whether the UID and/or TID is valid for the FID. In the event that the UID and/or the TID is not valid for the FID, the data from the packet can be excluded from the SMB named pipe date which is inspected by the IDS/IPS.

Referring now to FIG. 12, a flow chart illustrating a process 1201 to check for valid packets in an SMB named pipe according to the second embodiment will be discussed and described. In overview, the process includes receiving 1203 a fragment/segment in a transmission in one SMB named pipe, determining 1205 a kind of the application of the target of the fragment/segment, judging 1207 whether the kind of application of the target separates fragments/segments based on the MID, separating 1209 fragments/segments with the same MID as part of the same SMB transaction command from fragments/segments with a different MID all in the same SMB named pipe, judging 1211 whether the kind of application of the target separates based on PID, further separating 1213 fragments/segments with the same MID and same PID as part fo the same SMB transaction command from fragments/segments with a different MID or different PID all in the same SMB named pipe, processing 1215 the same SMB transaction command as being a SMB transaction command separate from those with a different MID or PID, and processing 1217 the fragments/segments as part of the SMB transaction. Each of these is described below, however, details that have previously been described are omitted.

The process 1201 can receive 1203 a fragment/segment in a transmission in one SMB named pipe. This has been described previously in sufficient detail.

The process 1201 can determine 1205 a kind of the application of the target of the fragment/segment using any known process, as previously described.

The process 1201 can judge 1207 whether the kind of application of the target separates fragments/segments based on the MID, such as by referring to a reassembly table. For example, the reassembly table can be indexed by the kind of application and can indicate whether to separate fragments based on MID. Equivalents can also be provided. The process 1201 can separate 1209 fragments/segments with the same MID as part of the same SMB transaction command from fragments/segments with a different MID all in the same SMB named pipe. In this case, the fragments/segments which are in the same SMB transaction have the same MID.

The process 1201 can judge 1211 whether the kind of application of the target separates based on PID, for example by referring to a reassembly table which indicates whether to separate fragments based on PID. The process 1201 further can separate 1213 fragments/segments with the same MID and same PID as part of the same SMB transaction command from fragments/segments with a different MID or different PID all in the same SMB named pipe. In this case, the fragments/segments which are in the same SMB transaction have the same MID and PID.

The process 1201 then can process 1215 the same SMB transaction command with the same MID (and perhaps same PID as discussed above) as being a separate SMB transaction, instead of with the different MID or PID, where the fragments/segments are all in the same SMB named pipe.

If the kind of application of the target does not separate based on MID, the process 1201 instead can process 1217 the fragments/segments as part of the SMB transaction.

Referring now to FIG. 13, a flow chart illustrating a process 1301 to reassemble DCE/RPC request fragments according to the third and fourth embodiments will be discussed and described. In overview, the process includes receiving 1303 fragments belonging to a single DCE/RPC request, determining 1305 a kind of application of the target of the DCE/RPC request, selecting 1307 a predetermined request fragment as a source of the context ID, selecting 1309 a predetermined request fragment as a source of the operation num, reassembling 1311 the DCE/RPC request, inserting 1313 the context ID and the operation number from the selected request fragment(s) into the DCE/RPC header of the reassembled requests, and evaluating 1315 the reassembled SMB request for intrusion. These are described below, however, details that have previously been described are omitted.

The process 1301 can receive 1303 fragments belonging to a single DCE/RPC request. Also, the process 1301 can determine 1305 a kind of application of the target of the DCE/RPC request. These have been previously described in detail.

The process 1301 can select 1307 a predetermined request fragment as a source of the context ID. The predetermined request fragment is associated with the kind of the application of the target. Thereby, different kinds of applications can indicate different request fragments. The request fragment could be, e.g., the first (or last) request fragment in order in the DCE/RPC request, the first (or last) request fragment in a DCE/RPC request to be received, or some intermediate request fragment.

The process 1301 can select 1309 a predetermined request fragment as a source of the operation number. The request fragment which is the source of the operation number may be different from the request fragment which is the source of the context ID.

The process 1301 can reassemble 1311 the DCE/RPC request, in accordance with known techniques, and can prepare a DCE/RPC header for the reassembled request. However, in comparison to conventional techniques, the process 1301 can insert 1313 the context ID and the operation number from the selected request fragment(s) into the DCE/RPC header of the reassembled requests.

Then, the process 1301 can evaluate 1315 the reassembled SMB request for intrusion in accordance with available IDS/IPS techniques.

Moreover, embodiments include a computer system configured with the foregoing computer-readable medium and/or method(s); and/or a communication network comprising at least one computer system configured with the foregoing computer-readable medium and/or method(s).

It should be noted that the communication networks of interest include those that transmit information in packets in accordance with SMB or DCE/RPC protocols, where the packets optionally can be formed into SMB segments/fragments or DCE/RPC request fragments, for example, those known as packet switching networks that transmit data, where data can be divided into packets before transmission, the packets are transmitted, and the packets are routed over network infrastructure devices, which are sent to a destination where the segments/fragments or packets can be reassembled into the packets. Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, and other wireless application protocols or wireline application protocols and/or other protocol structures, and variants and evolutions thereof. Such networks can provide wireless communications capability and/or utilize wireline connections such as cable and/or a connector, or similar.

SMB protocols include those known as SMB, SMB1, SMB2, Samba, Samba TNG, Linux SMB, CIFS, CIFS Client for Solaris, FreeBSD SMB, smbfs, Vision FS, JLAN, RTSMB, and variations and evolutions thereof. Typically, SMB protocol is operated between an SMB client and SMB server as source and destination, with the IDS/IPS being neither. SMB mainly provides access to file, printers, ports, and miscellaneous communications between the SMB client and SMB server.

DCE/RPC refers to a remote procedure call that supports access across multiple computers, as if it were all accessing on the same computer, as specified by the Open Group as DCE RPC 1.1, DCE RPC 1.2.2, DCE/RPC from Samba TNG, FreeDCE, PC/DCE, MSRPC, and variations and evolutions thereof.

Furthermore, the designation "intrusion detection/prevention system" (and IDS/IPS) is used herein to denote a device or software that passively or actively analyzes network traffic for intrusion. Examples of such devices or software are sometimes referred to as "intrusion detection system" (IDS), "intrusion prevention system" (IPS), "network intrusion detection system" (NIDS), "network intrusion protection system" (NIPS"), and the like, and variants or evolutions thereof. An intrusion detection/prevention system may be host-based, or may monitor traffic to a target system using, for example, sensors, anywhere between the target system and the intruder, typically after a final router or firewall. The designation "intrusion detection/prevention" is used herein to indicate the analysis of network traffic with respect to intrusion, whether the analysis is used passively (commonly referred to as "intrusion detection") or actively (commonly referred to as "intrusion prevention"). Likewise, the designation "detect/ prevent" is utilized to indicate either passive or active handling of intrusion, which may occur for example in an IDS, an IPS, or other software or device which incorporates an IDS or IPS function.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiments) was chosen and described to provide the best illustration of the principles of the invention and its practical application, and to enable one of ordinary skill in the art to utilize the invention in various embodiments and with various modifications as are suited to the particular use contemplated.

All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method performed in a processor of an intrusion detection/prevention system (IDS/IPS), for checking for valid packets in a server message block (SMB) named pipe in a communication network, comprising:

receiving, in a processor configured as an IDS/IPS, a packet in a transmission and determining a kind of application of a target of the packet in response to receiving the packet;

including, in the IDS/IPS, data in the packet as part of the SMB named pipe data inspected by the IDS/IPS as part of the SMB named pipe on only one of a condition that:

(a) a file ID (FID) in an SMB command header of the packet is valid (i) for segments/fragments in the SMB named pipe and (ii) for the determined kind of application of the target of the packet, as indicated by a reassembly table, and (b) the determined kind of application of the target of the packet does not check the FID, as indicated by the reassembly table;

receiving, in the processor configured as an IDS/IPS, a fragment/segment, and determining a kind of application of a target of the fragment/segment in response to receiving the fragment/segment;

separating, in the IDS/IPS, fragments/segments with a same multiplex ID (MID) as part of a same SMB transaction command from fragments/segments with a different MID, the MID being in the SMB frame header, all for fragments/segments in the same SMB named pipe, when a reassembly table indicates that the kind of application of the target separates based on MID;

processing, in the IDS/IPS, the same SMB transaction command with the same MID as being in a separate SMB transaction command instead of with the fragments/segments with the different MID when the kind of application of the target separates based on MID;

receiving, in the processor configured as an IDS/IPS, plural request fragments belonging to a single distributed computing environment/remote procedure call (DCE/RPC) request;

determining, in the IDS/IPS, the kind of application of a target of the DCE/RPC request; selecting, in the IDS/ IPS, one of the request fragments as a source of a context ID depending on the target kind of application as indicated in a reassembly table;

selecting, in the IDS/IPS, one of the request fragments as a source of an operation number as indicated in a reassembly table depending on the target kind of application;

reassembling, in the IDS/IPS, the plural request fragments into a reassembled request; and inserting, in the IDS/IPS, the context ID from the selected request fragment into the context ID of a DCE/RPC header of the reassembled request; and inserting, in the IDS/IPS, the operation number from a DCE/RPC header of the selected request fragment into the operation number of a DCE/RPC header of the reassembled request.

* * * * *